United States Patent
Oue et al.

(10) Patent No.: US 10,387,998 B2
(45) Date of Patent: Aug. 20, 2019

(54) ELECTRONIC APPARATUS AND NON-TRANSITORY COMPUTER READABLE MEDIUM STORING PROGRAM

(71) Applicant: FUJI XEROX CO., LTD., Tokyo (JP)

(72) Inventors: Suguru Oue, Kanagawa (JP); Masaki Nudejima, Kanagawa (JP); Takayuki Hashimoto, Kanagawa (JP); Tomoyuki Ono, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1 day.

(21) Appl. No.: 15/793,990

(22) Filed: Oct. 26, 2017

(65) Prior Publication Data

US 2018/0357751 A1    Dec. 13, 2018

(30) Foreign Application Priority Data

Jun. 9, 2017    (JP) .................. 2017-114675

(51) Int. Cl.
| | | |
|---|---|---|
| *G06T 3/40* | (2006.01) | |
| *G06F 13/28* | (2006.01) | |
| *G06T 1/60* | (2006.01) | |

(52) U.S. Cl.
CPC ............ *G06T 3/4023* (2013.01); *G06F 13/28* (2013.01); *G06T 1/60* (2013.01); *G06T 2200/28* (2013.01)

(58) Field of Classification Search
CPC .............................. G06T 3/4023; G06F 13/28
USPC ......................................................... 710/22
See application file for complete search history.

(56) References Cited

U.S. PATENT DOCUMENTS

| | | | | |
|---|---|---|---|---|
| 4,860,119 | A * | 8/1989 | Maniwa ............. | H04N 1/00572 358/296 |
| 4,907,094 | A * | 3/1990 | Mishima ................. | H04L 13/08 358/404 |
| 5,068,905 | A * | 11/1991 | Hackett ................. | G06T 3/4023 345/698 |
| 5,266,805 | A * | 11/1993 | Edgar .................. | H04N 1/4097 250/330 |
| 5,444,550 | A * | 8/1995 | Enokida .................... | G06T 1/20 358/448 |
| 5,517,612 | A * | 5/1996 | Dwin ........................ | G06T 3/40 345/502 |
| 5,729,715 | A * | 3/1998 | Ina .................... | G06F 17/30017 707/999.202 |
| 8,160,398 | B1 * | 4/2012 | Avidan ................. | H04N 1/3875 345/660 |
| 10,002,301 | B1 * | 6/2018 | Mahmoud ............... | G06F 3/018 |
| 2005/0008258 | A1 * | 1/2005 | Suzuki ................. | G06T 3/4015 382/298 |

(Continued)

FOREIGN PATENT DOCUMENTS

JP         2000151995         5/2000

*Primary Examiner* — Paul R. Myers
(74) *Attorney, Agent, or Firm* — JCIPRNET

(57) ABSTRACT

An electronic apparatus includes: an enlargement and reduction unit that enlarges or reduces an image input by direct memory access (DMA) transfer; and an image processing unit that, in a case where a size of an image after processing for enlargement or reduction by the enlargement and reduction unit is different from a size determined in advance as a size of an image after the processing, performs processing for adding pixels to the processed image or processing for deleting pixels of the processed image.

8 Claims, 16 Drawing Sheets

(56) References Cited

U.S. PATENT DOCUMENTS

| | | | | |
|---|---|---|---|---|
| 2005/0249436 | A1* | 11/2005 | Chiu | G06K 9/32 |
| | | | | 382/298 |
| 2007/0258012 | A1* | 11/2007 | Miller | H04N 7/0122 |
| | | | | 348/581 |
| 2008/0149033 | A1* | 6/2008 | Hebrank | G01N 33/085 |
| | | | | 119/6.8 |
| 2010/0211794 | A1* | 8/2010 | Bilobrov | G06K 9/00067 |
| | | | | 713/176 |
| 2010/0309526 | A1* | 12/2010 | Kulkarni | G03G 15/235 |
| | | | | 358/3.26 |
| 2010/0332981 | A1* | 12/2010 | Lipton | G11B 27/034 |
| | | | | 715/716 |
| 2011/0025819 | A1* | 2/2011 | Gorzynski | H04N 7/147 |
| | | | | 348/14.07 |
| 2013/0077887 | A1* | 3/2013 | Elton | G06T 3/4053 |
| | | | | 382/264 |
| 2015/0154792 | A1* | 6/2015 | Shi | G06T 3/0012 |
| | | | | 345/427 |
| 2015/0163370 | A1* | 6/2015 | Suzuki | H04N 1/2129 |
| | | | | 348/231.99 |
| 2015/0350489 | A1* | 12/2015 | Hasegawa | H04N 1/3876 |
| | | | | 358/449 |
| 2015/0379722 | A1* | 12/2015 | Goldberg | G06Q 10/10 |
| | | | | 382/298 |
| 2018/0032210 | A1* | 2/2018 | Cutu | G06F 3/0425 |

* cited by examiner

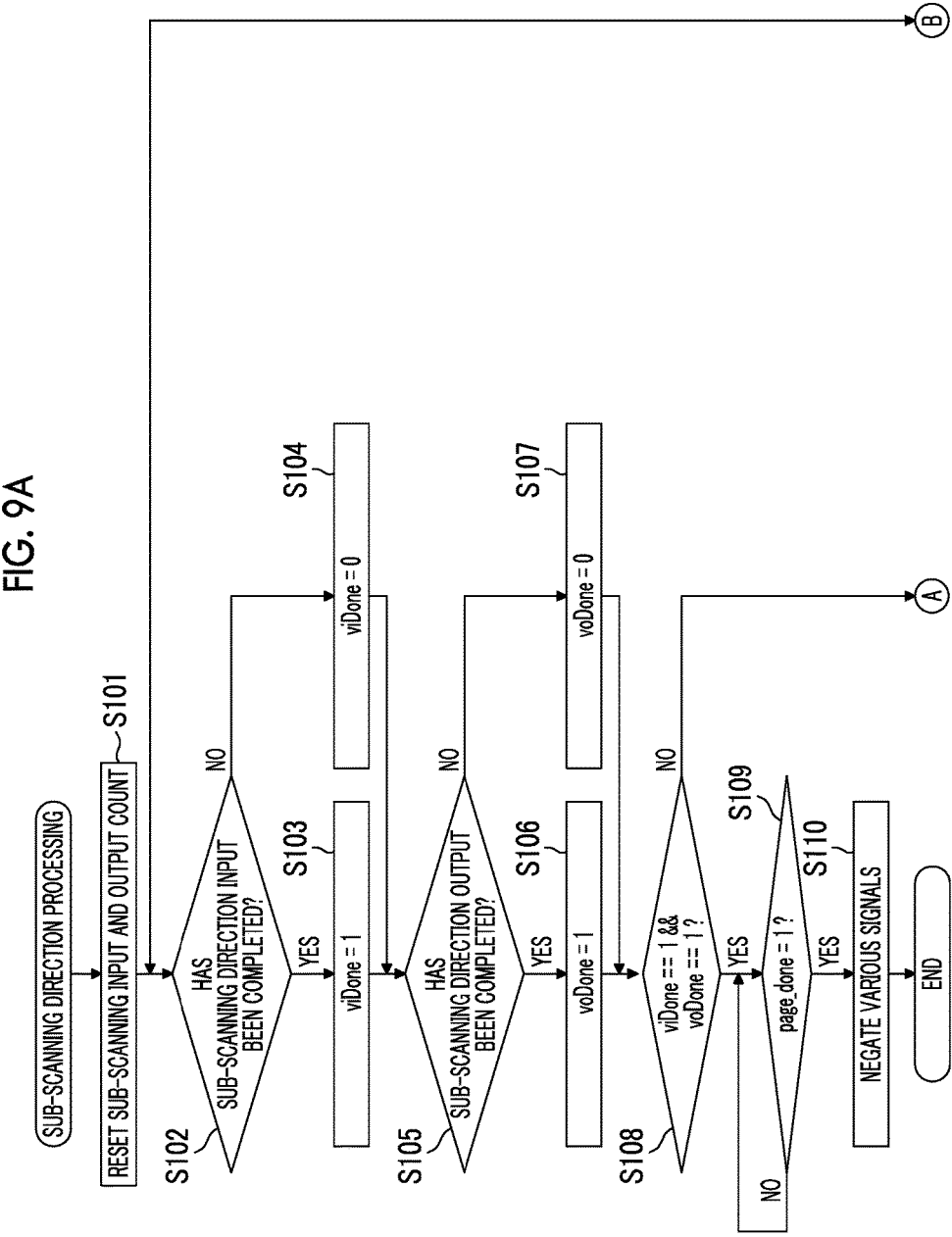

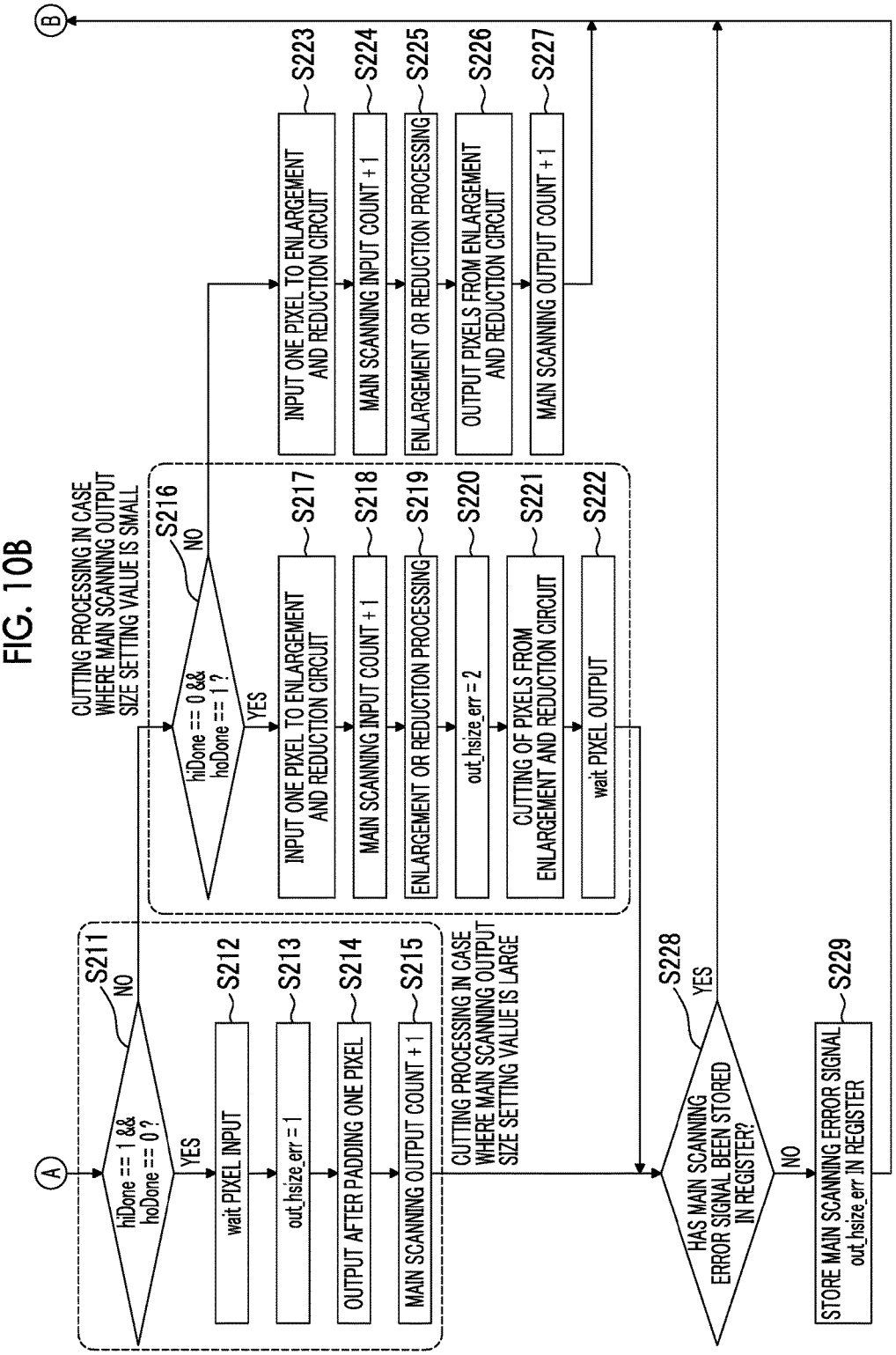

ELECTRONIC APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-114675 filed Jun. 9, 2017.

BACKGROUND

Technical Field

The present invention relates to an electronic apparatus and a non-transitory computer readable medium storing a program.

SUMMARY

According to an aspect of the invention, there is provided an electronic apparatus including an enlargement and reduction unit that enlarges or reduces an image input by direct memory access (DMA) transfer and an image processing unit that, in a case where a size of an image after processing for enlargement or reduction by the enlargement and reduction unit is different from a size determined in advance as a size of an image after the processing, performs processing for adding pixels to the processed image or processing for deleting pixels of the processed image.

BRIEF DESCRIPTION OF THE DRAWINGS

Exemplary embodiment(s) of the present invention will be described in detail based on the following figures, wherein:

FIG. 9A is a flowchart showing an exemplary embodiment of the procedure of processing in the sub-scanning direction;

FIG. 10B is a flowchart showing an exemplary embodiment of the procedure of main scanning direction normal processing;

DETAILED DESCRIPTION

Hereinafter, exemplary embodiments of the invention will be described with reference to the accompanying diagrams.

Hardware Configuration of Image Processing Apparatus

Figure 1:
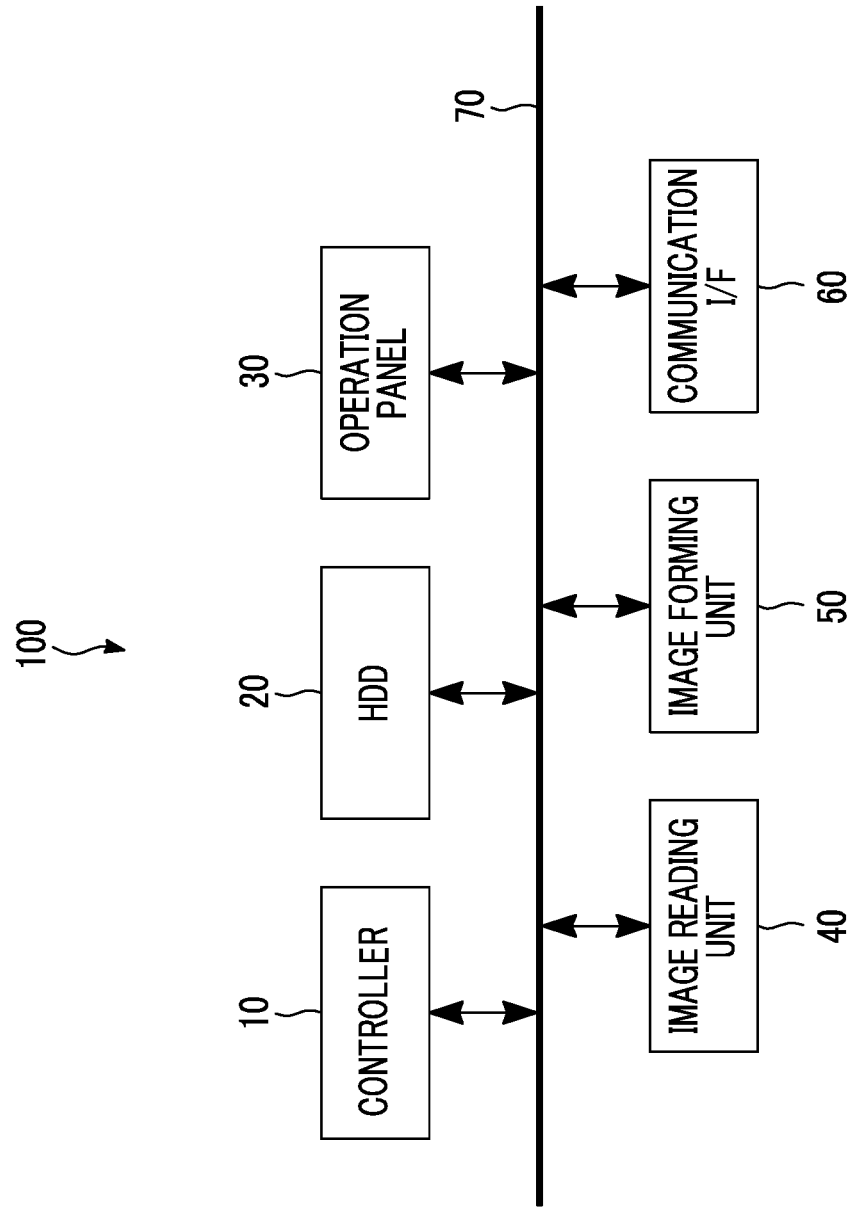
FIG. 1 is a diagram showing an example of the hardware configuration of an image processing apparatus according to the present exemplary embodiment.

First, the hardware configuration of an image processing apparatus 100 according to the present exemplary embodiment will be described. FIG. 1 is a diagram showing the hardware configuration of the image processing apparatus 100 according to the present exemplary embodiment. The image processing apparatus 100 according to the present exemplary embodiment is, for example, a so-called multi-function machine having various image processing functions, such as an image reading function (scan function), a print function, a copy function, and a facsimile function. In the present exemplary embodiment, the image processing apparatus 100 is used as an exemplary embodiment of an electronic apparatus.

As shown in FIG. 1, the image processing apparatus 100 according to the present exemplary embodiment includes a controller 10, a hard disk drive (HDD) 20, an operation panel 30, an image reading unit 40, an image forming unit 50, and a communication interface (hereinafter, referred to as a "communication I/F") 60. These functional units are connected to a bus 70, so that data is transmitted and received therebetween through the bus 70.

The controller 10 controls the operation of each unit of the image processing apparatus 100. Details of the configuration of the controller 10 will be described later.

The HDD 20 is a storage unit that stores various kinds of data. For example, image data generated by image reading of the image reading unit 40 or image data received from the outside by the communication I/F 60 is stored in the HDD 20.

The operation panel 30 displays various kinds of information, and receives an operation from the user. The operation panel 30 is configured to include a display panel that is a liquid crystal display or the like, a touch panel that is disposed on the display panel to detect a position touched by the user, a physical key pressed by the user, and the like. For example, the operation panel 30 displays various screens, such as an operation screen of the image processing apparatus 100, on the display panel, or receives an operation from the user using the touch panel and the physical key.

The image reading unit 40 reads an image formed on a recording material, such as paper set on a document table, and generates image information (image data) indicating the read image. Here, the image reading unit 40 is, for example, a scanner. A charge coupled device (CCD) type image reading unit, which reduces reflected light of light emitted to a document from a light source using a lens and receives the reduced light with the CCD, and a contact image sensor (CIS) type image reading unit, which receives reflected light of light sequentially emitted to a document from an LED light source using the CIS, may be used.

The image forming unit 50 is a printing mechanism that forms an image on a recording material, such as paper. Here, the image forming unit 50 is, for example, a printer. An electrophotographic type image forming unit that forms an image by transferring toner attached to a photoreceptor onto a recording material or an inkjet type image forming unit that forms an image by ejecting ink onto a recording material may be used.

The communication I/F 60 is a communication interface for transmitting and receiving various kinds of data to and from other apparatuses through a network (not shown).

In the image processing apparatus 100, under the control of the controller 10, a scan function is realized by the image reading unit 40, a print function is realized by the image forming unit 50, a copy function is realized by the image reading unit 40 and the image forming unit 50, and a facsimile function is realized by the image reading unit 40, the image forming unit 50, and the communication I/F 60.

Configuration of Controller

Figure 2:
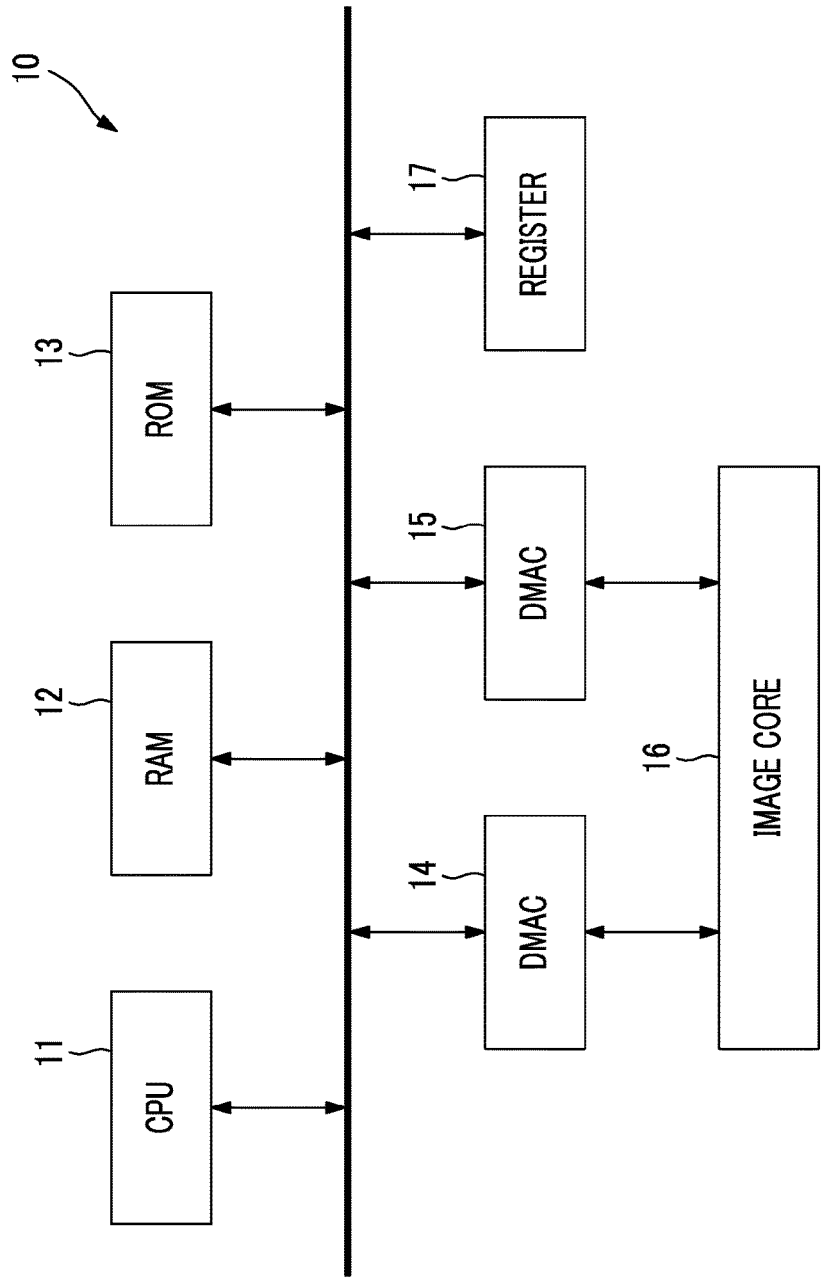
FIG. 2 is a diagram showing an exemplary embodiment of the configuration of a controller according to the present exemplary embodiment.

Next, the configuration of the controller 10 will be described in detail. FIG. 2 is a diagram showing an exemplary embodiment of the configuration of the controller 10 according to the present exemplary embodiment. As shown in FIG. 2, the controller 10 according to the present exemplary embodiment includes a central processing unit (CPU) 11, a random access memory (RAM) 12, a read only memory (ROM) 13, a direct memory access controller (DMAC) 14, a DMAC 15, an image core 16, and a register 17.

The CPU 11 controls the operation of each unit of the image processing apparatus 100 by loading various programs stored in the ROM 13 or the like to the RAM 12 and executing the programs, thereby realizing each function in the image processing apparatus 100. The RAM 12 is a memory (storage unit) used as a work memory or the like of the CPU 11. As an exemplary embodiment of the RAM 12, a double-data-rate SDRAM (DDRSDRAM) that is one type of synchronous dynamic random access memory (SDRAM) may be exemplified. The ROM 13 is a memory (storage unit) that stores various programs executed by the CPU 11 and the like.

The DMAC 14 and the DMAC 15 are controllers that control DMA transfer for transmitting data without passing through the CPU 11. For example, the DMAC 14 reads data from the RAM 12 or the ROM 13, and transmits the read data to the image core 16. In addition, the DMAC 15 transmits data output from the image core 16 to the RAM 12 or the ROM 13, for example.

The image core 16 performs processing for enlarging or reducing image data input from the DMAC 14 at a designated magnification or the like, and outputs the processed image data to the DMAC 15.

The register 17 as an exemplary embodiment of a memory stores a setting value of the size of image data input to the image core 16 (hereinafter, referred to as an "input size setting value"), a setting value of the magnification in the case of enlarging or reducing image data, or a setting value of the size of image data that is output after being enlarged or reduced by the image core 16 (hereinafter, referred to as an "output size setting value"). In addition, the register 17 stores error information regarding the output size setting value.

More specifically, the input size setting value is a value indicating the size of image data input to the image core 16. For example, the input size setting value is a value of the size of a scanned document or a size (for example, B4 size) specified by the user. The setting value of the magnification is, for example, a value of a magnification ratio for enlargement or reduction specified by the user. The output size setting value is a value calculated from the input size setting value and the magnification setting value, and is a value set as the size of image data that is output by enlarging or reducing the image data of the input size setting value with a magnification ratio. In the present exemplary embodiment, the output size setting value is used as an exemplary embodiment of a predetermined size.

In the following description, the input size setting value in the main scanning direction is referred to as a "main scanning input size setting value". The input size setting value in the sub-scanning direction is referred to as a "sub-scanning input size setting value". The output size setting value in the main scanning direction is referred to as a "main scanning output size setting value". The output size setting value in the sub-scanning direction is referred to as a "sub-scanning output size setting value".

Figure 3:
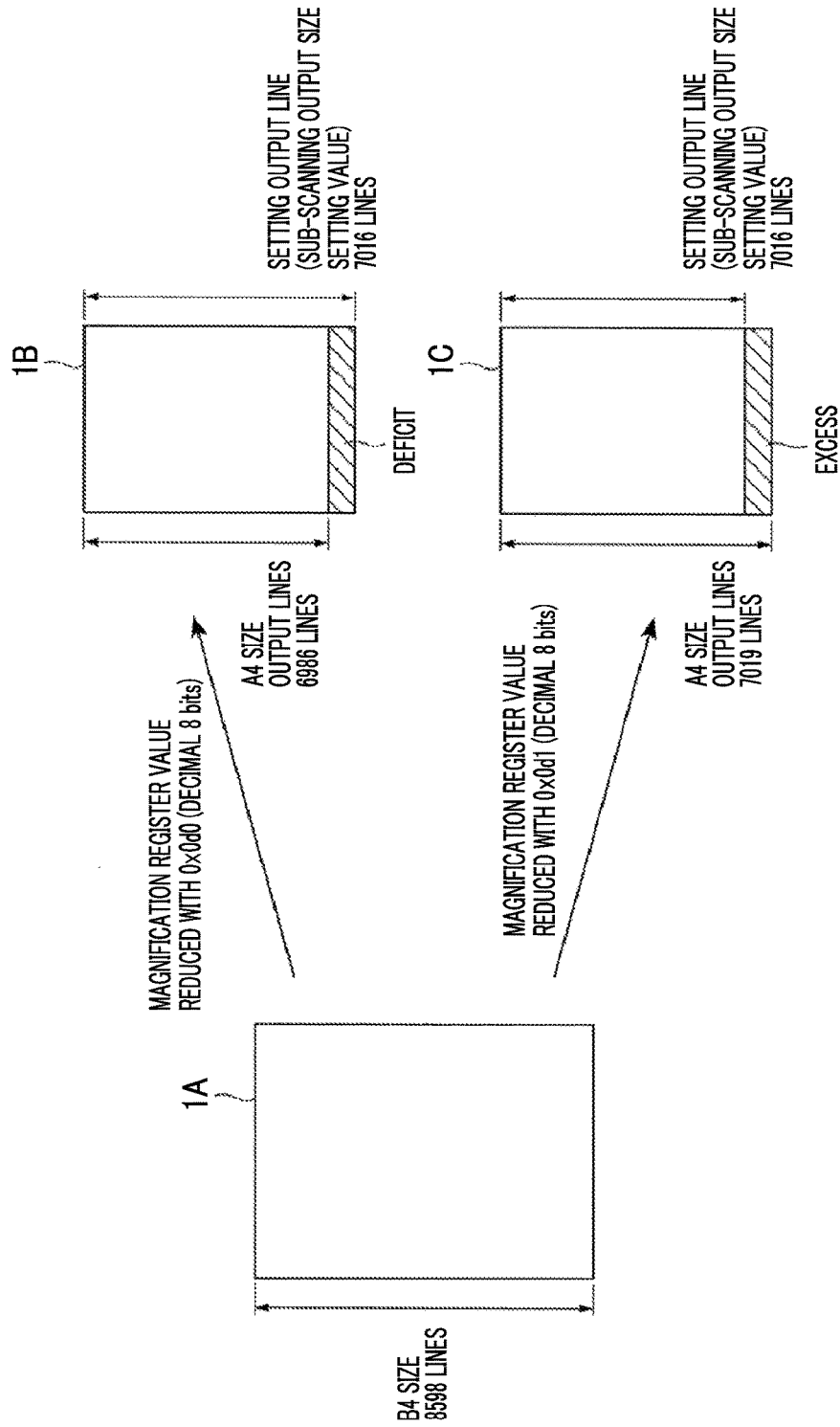
FIG. 3 is a diagram illustrating an exemplary embodiment of enlargement and reduction processing in the related art.

Here, known enlargement and reduction processing will be described. FIG. 3 is a diagram illustrating an exemplary embodiment of the known enlargement and reduction processing. In the exemplary embodiment shown in FIG. 3, image data 1A indicates B4-size image data of 600 dots per inch (dpi) on the page memory. The number of lines of the image data 1A is B4 size vertical (364 mm)×(600 dpi/25.4 mm)≅8598 lines. A process of reducing the image data 1A to output it in A4 size will be described.

In this case, the number of output lines is set to A4 size vertical (297 mm)×(600 dpi/25.4 mm)≅7016 lines. At this time, a magnification ratio R is R=(297 mm)/(364 mm)≅0.816. In the case of processing the decimal part of the magnification ratio with, for example, 8 bits, the processing result is 0.816×256≅208=d0 or 0.816×256≅209≅d1 in a case where the decimal part is expressed in hexadecimal notation. Therefore, depending on whether the magnification ratio is set to d0 or d1, the number of output lines changes.

More specifically, for example, in a case where the magnification ratio is set to d0, the number of output lines is 364 mm×(208/256)×(600 dpi/25.4 mm)≅6986 lines as in image data 1B. On the other hand, for example, in a case where the magnification ratio is set to d1, the number of output lines is 364 mm×(209/256)×(600 dpi/25.4 mm)≅7019 lines as in image data 1C.

In the case of the image data 1B, since the number of output lines (6986 lines) is smaller than the set number of output lines (that is, the sub-scanning output size setting value; 7016 lines), the amount of image data 1B is insufficient by the amount of shaded image data. Therefore, since input by the DMA transfer ends to stop data coming, output in the DMA transfer stalls. On the other hand, in the case of the image data 1C, since the number of output lines (7019 lines) is larger than the set number of output lines (7016 lines), the amount of data is excessive by the amount of shaded image data. Therefore, since output by the DMA transfer ends to stop data output, input in the DMA transfer stalls.

In this manner, in the image data enlargement and reduction processing, stalling may occur due to an error in bit accuracy. Without being limited to the error in bit accuracy described above, for example, in a case where the output size setting value of image data is erroneous, stalling in the DMA transfer may occur.

In the present exemplary embodiment, therefore, control is performed so that the DMA transfer does not stall by cutting and padding the image data. Hereinafter, the image core 16 and the like for realizing such control will be described.

Configuration of Image Core

Figure 4:
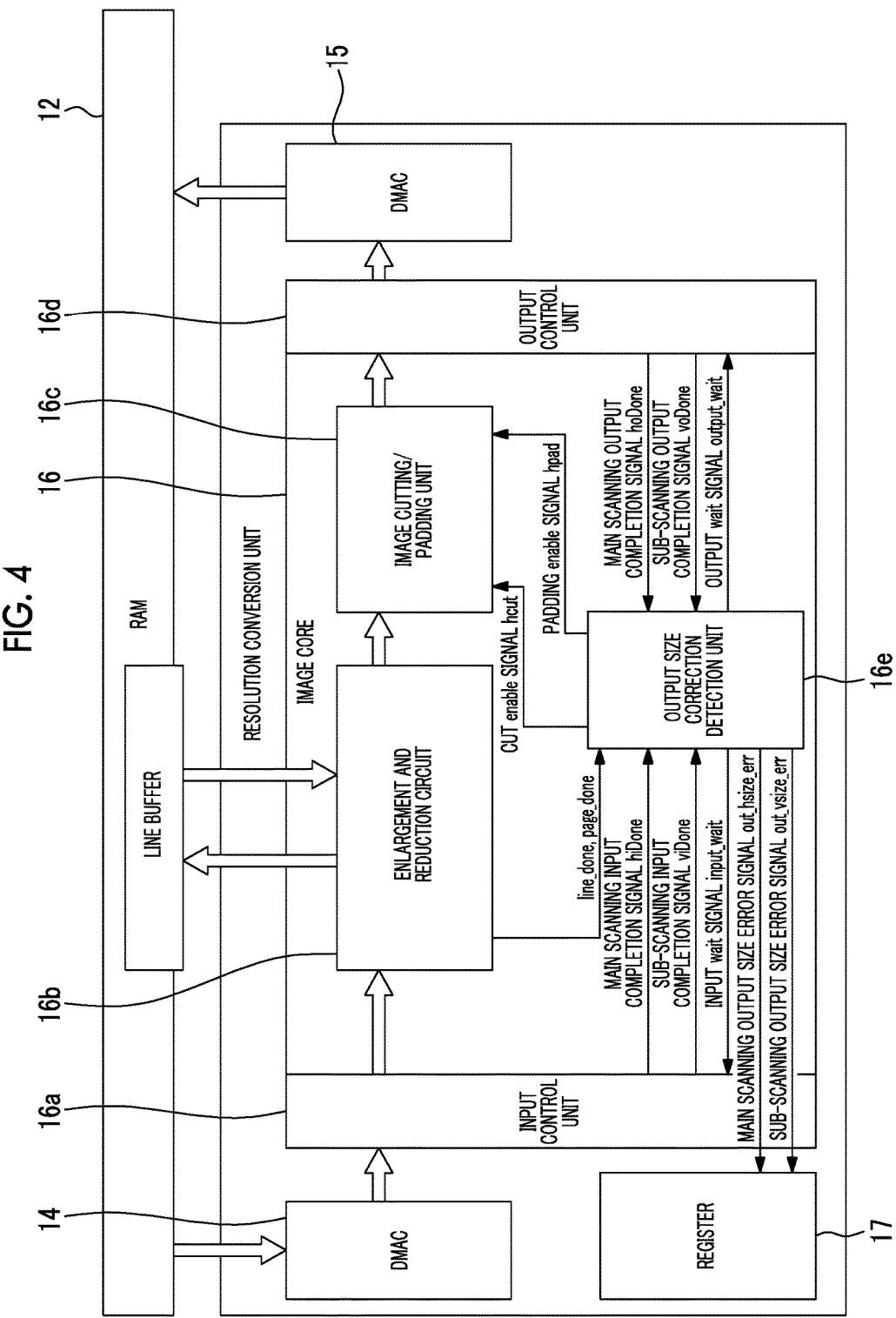
FIG. 4 is a diagram showing an exemplary embodiment of the configuration of an image core according to the present exemplary embodiment.

Next, the configuration of the image core 16 will be described in detail. FIG. 4 is a diagram showing an example of the configuration of the image core 16 according to the present exemplary embodiment. As shown in FIG. 4, the image core 16 according to the present exemplary embodiment includes an input controller 16a, an enlargement and reduction circuit 16b, an image cutting/padding unit 16c, an output controller 16d, and an output size correction detection unit 16e.

In the exemplary embodiment shown in FIG. 4, the RAM 12 is shown as a memory for transmitting and receiving data to and from the image core 16 through the DMAC 14 and the DMAC 15. Although details are omitted in the configuration shown in FIG. 4, a DMA bus is also present between the enlargement and reduction circuit 16b and the line buffer of the RAM 12. DMA transfer is also performed on the DMA bus, and the enlargement and reduction circuit 16b performs enlargement and reduction processing by storing image data in a line buffer or by reading the image data from the line buffer. The DMAC 14, the DMAC 15, the image core 16, and the register 17 are collectively referred to as a "resolution conversion unit" that converts the resolution of image data.

The input controller 16a controls the input of image data in the image core 16. Here, the input controller 16a inputs image data transmitted from the DMAC 14 to the enlargement and reduction circuit 16b. More specifically, the input controller 16a sequentially inputs image data transmitted from the DMAC 14 to the enlargement and reduction circuit 16b. Then, in a case where the input of image data to the enlargement and reduction circuit 16b is completed, a signal indicating that the input has been completed is output to the output size correction detection unit 16e.

More specifically, in a case where the input of image data of one line to the enlargement and reduction circuit 16b in the main scanning direction is completed, the input controller 16a asserts a signal indicating that the input in the main scanning direction has been completed (hereinafter, referred to as a "main scanning input completion signal (hiDone)"), and outputs the signal to the output size correction detection unit 16e. In other words, the input controller 16a sets the main scanning input completion signal (hiDone) to "1", and then outputs the main scanning input completion signal (hiDone) to the output size correction detection unit 16e.

In a case where the input of image data to the enlargement and reduction circuit 16b in the sub-scanning direction is completed, the input controller 16a asserts a signal indicating that the input in the sub-scanning direction has been completed (hereinafter, referred to as a "sub-scanning input completion signal (viDone)"), and outputs the signal to the output size correction detection unit 16e. In other words, the input controller 16a sets the sub-scanning input completion signal (viDone) to "1", and then outputs the sub-scanning input completion signal (viDone) to the output size correction detection unit 16e.

The input controller 16a waits for or resumes inputting the image data to the enlargement and reduction circuit 16b based on an instruction from the output size correction detection unit 16e. More specifically, the input controller 16a waits for the input of image data in a case where a signal for controlling whether or not to wait for the input of image data (hereinafter, referred to as an "input wait signal (input_wait)") is set to "1" and is notified from the output size correction detection unit 16e.

As will be described later, the input wait signal (input_wait) is negated to "0" after processing on one line is completed by the enlargement and reduction circuit 16b. That is, after the processing on one line is completed by the enlargement and reduction circuit 16b, the input controller 16a resumes the input of image data.

In the present embodiment, as exemplary embodiments of an input completion signal indicating that the input of an image to an enlargement and reduction unit has been completed, the main scanning input completion signal (hiDone) and the sub-scanning input completion signal (viDone) are used.

The enlargement and reduction circuit 16b as an exemplary embodiment of an enlargement and reduction unit and a reception unit receives an instruction of enlargement or reduction by a setting value (parameter) written in advance in, for example, the register 17, and performs processing for enlarging or reducing the image data input from the input controller 16a at a designated magnification. Then, the processed image data is transmitted to the image cutting/padding unit 16c.

Here, in a case where the processing for enlarging or reducing the image data has ended or one line, the enlargement and reduction circuit 16b outputs a signal indicating that processing on one line has ended (hereinafter, referred to as a "line processing end signal (line_done)") to the output size correction detection unit 16e. In a case where the processing for enlarging or reducing the image data has ended up to the last line (that is, in a case where processing on the entire page is ended), the enlargement and reduction circuit 16b outputs a signal indicating that the processing up to the last line has ended (hereinafter, referred to as a "page processing end signal (page_done)") to the output size correction detection unit 16e.

The image cutting/padding unit 16c as an exemplary embodiment of an image processing unit and a generation unit performs deletion (cutting) of pixels (image data) or addition (padding) of pixels on the image data processed by the enlargement and reduction circuit 16b. In a case where the size of the image data processed by the enlargement and reduction circuit 16b is different from the output size setting value, the image cutting/padding unit 16c performs processing for deleting pixels of the processed image data or processing for adding pixels to the processed image data. In other words, in a case where the magnification designated as the magnification of the enlargement or reduction is a magnification at which stalling may occur in the DMA transfer, the image cutting/padding unit 16c performs processing for deleting pixels or processing for adding pixels to generate an image of a size in which DMA transfer does not stall.

More specifically, in a case where a signal instructing to cut pixels (hereinafter, referred to as a "cut enable signal (hcut)") is received from the output size correction detection unit 16e, the image cutting/padding unit 16c cuts pixels. In a case where a signal instructing to perform padding of pixels (hereinafter, referred to as a "padding enable signal (hpad)") is received from the output size correction detection unit 16e, the image cutting/padding unit 16c performs padding of pixels. Pixels to be padded are dummy pixels. For example, white pixels having a pixel value 255 are used.

As will be described later, a cut enable signal (hcut) and a padding enable signal (hpad) are negated to "0" after the processing on one line is completed by the enlargement and reduction circuit 16b. That is, after the processing on one line is completed by the enlargement and reduction circuit 16b, the image cutting/padding unit 16c ends the pixel cutting/padding processing.

The output controller 16d control the output of image data in the image core 16. Here, the output controller 16d output the image data transmitted from the image cutting/padding unit 16c to the DMAC 15. More specifically, the output controller 16d sequentially outputs the image data transmitted from the image cutting/padding unit 16c to the DMAC 15. Then, in a case where the output of image data corresponding to the output size setting value is completed, a signal indicating that the output has been completed is output to the output size correction detection unit 16e.

More specifically, in a case where the output of image data corresponding to the setting value (that is, the main scanning output size setting value) to the DMAC 15 in the main scanning direction is completed, the output controller 16d asserts a signal indicating that the output in the main scanning direction has been completed (hereinafter, referred to as a "main scanning output completion signal (hoDone)"), and outputs the signal to the output size correction detection unit 16e. In other words, the output controller 16d sets the main scanning output completion signal (hoDone) to "1", and then outputs the main scanning output completion signal (hoDone) to the output size correction detection unit 16e.

In a case where the output of image data corresponding to the setting value (that is, the sub-scanning output size setting value) to the DMAC 15 in the sub-scanning direction is completed, the output controller 16d asserts a signal indicating that the output in the sub-scanning direction has been completed (hereinafter, referred to as a "sub-scanning output completion signal (voDone)"), and outputs the signal to the output size correction detection unit 16e. In other words, the output controller 16d sets the sub-scanning output completion signal (voDone) to "1", and then outputs the sub-scanning output completion signal (voDone) to the output size correction detection unit 16e.

The output controller 16d waits for or resumes outputting the image data to the DMAC 15 based on an instruction from the output size correction detection unit 16e. More specifically, the output controller 16d waits for the output of image data in a case where a signal for controlling whether or not to wait for the output of image data (hereinafter, referred to as an "output wait signal (output_wait)") is set to "1" and is notified from the output size correction detection unit 16e.

As will be described later, the output wait signal (output_wait) is negated to "0" after processing on one line is completed by the enlargement and reduction circuit 16b. That is, after the processing on one line is completed by the enlargement and reduction circuit 16b, the output controller 16d resumes the output of image data.

In the present embodiment, as exemplary embodiments of an output completion signal indicating that the output of an image having a predetermined size has been completed, the main scanning output completion signal (hoDone) and the sub-scanning output completion signal (voDone) are used.

The output size correction detection unit 16e as an exemplary embodiment of a detection unit detects that there is an error in the main scanning output size setting value or the sub-scanning output size setting value based on the signal received from each unit. Then, according to the content of the detected error, the output size correction detection unit 16e outputs the cut enable signal (hcut) or the padding enable signal (hpad) to the image cutting/padding unit 16c. In addition, the output size correction detection unit 16e outputs the input wait signal (input_wait) to the input controller 16a, or outputs the output wait signal (output_wait) to the output controller 16d.

Here, a case where there is an error in the main scanning output size setting value will be described first.

In a case where the output of image data corresponding to the setting value (main scanning output size setting value) in the main scanning direction is completed but the input of image data in the main scanning direction is not completed, the output size correction detection unit 16e detects that the main scanning output size setting value is smaller than the actual output size. In other words, in a case where the main scanning output completion signal (hoDone=1) is received but the main scanning input completion signal (hiDone=1) is not received, the output size correction detection unit 16e detects that the main scanning output size setting value is smaller than the actual output size.

In this case, the output size correction detection unit 16e stores an error signal (out_hsize_err), which is set to "2" indicating that the main scanning output size setting value is smaller than the actual output size, in the register 17. The output size correction detection unit 16e outputs the cut enable signal (hcut) to the image cutting/padding unit 16c so that pixels are cut until the input in the main scanning direction is completed. In addition, the output size correction detection unit 16e sets the output wait signal (output_wait) to "1" and outputs the output wait signal (output_wait) to the output controller 16d, so that the output of image data is awaited until the input in the main scanning direction is completed.

Then, in a case where the input of image data in the main scanning direction is completed but the output of image data corresponding to the setting value (main scanning output size setting value) in the main scanning direction is not completed, the output size correction detection unit 16e detects that the main scanning output size setting value is larger than the actual output size. In other words, in a case where the main scanning input completion signal (hiDone=1) is received but the main scanning output completion signal (hoDone=1) is not received, the output size correction detection unit 16e detects that the main scanning output size setting value is larger than the actual output size.

In this case, the output size correction detection unit 16e stores the error signal (out_hsize_err), which is set to "1" indicating that the main scanning output size setting value is larger than the actual output size, in the register 17. The output size correction detection unit 16e outputs the padding enable signal (hpad) to the image cutting/padding unit 16c so that pixels are padded until the output of image data corresponding to the setting value in the main scanning direction is completed. In addition, the output size correction detection unit 16e sets the input wait signal (input_wait) to "1" and outputs the input wait signal (input_wait) to the input controller 16a, so that the input of image data is awaited until the output of image data corresponding to the setting value in the main scanning direction is completed.

Next, a case where there is an error in the sub-scanning output size setting value will be described.

In a case where the output of image data corresponding to the setting value (sub-scanning output size setting value) in the sub-scanning direction is completed but the input of image data in the sub-scanning direction is not completed, the output size correction detection unit 16e detects that the sub-scanning output size setting value is smaller than the actual output size. In other words, in a case where the sub-scanning output completion signal (voDone=1) is received but the sub-scanning input completion signal (viDone=1) is not received, the output size correction detection unit 16e detects that the sub-scanning output size setting value is smaller than the actual output size.

In this case, the output size correction detection unit 16e stores an error signal (out_vsize_err), which is set to "2" indicating that the sub-scanning output size setting value is smaller than the actual output size, in the register 17. The output size correction detection unit 16e outputs the cut enable signal (hcut) to the image cutting/padding unit 16c so that pixels are cut until the input in the sub-scanning direction is completed. In addition, the output size correction detection unit 16e sets the output wait signal (output_wait) to "1" and outputs the output wait signal (output_wait) to the output controller 16d, so that the output of image data is awaited until the input in the sub-scanning direction is completed.

Then, in a case where the input of image data in the sub-scanning direction is completed but the output of image data corresponding to the setting value (sub-scanning output size setting value) in the sub-scanning direction is not completed, the output size correction detection unit 16e detects that the sub-scanning output size setting value is larger than the actual output size. In other words, in a case where the sub-scanning input completion signal (viDone=1) is received but the sub-scanning output completion signal (voDone=1) is not received, the output size correction detection unit 16e detects that the sub-scanning output size setting value is larger than the actual output size.

In this case, the output size correction detection unit 16e stores the error signal (out_vsize_err), which is set to "1" indicating that the sub-scanning output size setting value is larger than the actual output size, in the register 17. The output size correction detection unit 16e outputs the padding enable signal (hpad) to the image cutting/padding unit 16c so that pixels are padded until the output of image data corresponding to the setting value in the sub-scanning direction is completed. In addition, the output size correction detection unit 16e sets the input wait signal (input_wait) to "1" and outputs the input wait signal (input_wait) to the input controller 16a, so that the input of image data is awaited until the output of image data corresponding to the setting value in the sub-scanning direction is completed.

In this manner, the output size correction detection unit 16e detects that there is an error in the main scanning output size setting value or the sub-scanning output size setting value, and outputs the cut enable signal (hcut) or the padding enable signal (hpad) to the image cutting/padding unit 16c. Through the error signal stored in the register 17, the user is notified that there is an error in the main scanning output size setting value or the sub-scanning output size setting value. The user may perform debugging by specifying an error based on the error signal stored in the register 17.

Description of Image Cutting/Padding Processing

Next, a flow of processing for cutting or padding image data in a case where there is an error in the main scanning output size setting value or the sub-scanning output size setting value will be described in detail. FIGS. 5 to 8 are diagrams illustrating the processing in a case where there is an error in the main scanning output size setting value or the sub-scanning output size setting value.

In the exemplary embodiments shown in FIGS. 5 to 8, "IN DATA" is image data that is input to the input controller 16a from the DMAC 14. "OUT DATA" is image data that is output from the output controller 16d to the DMAC 15 after processing by the enlargement and reduction circuit 16b is performed. "hiDone", "hoDone", "viDone", "voDone", "out_hsize_err", "out_vsize_err", "hcut", "hpad", "input_wait", "output_wait", "line_done", and "page_done" are various signals described above.

In addition, "hiDone", "hoDone", "out_hsize_err", and "line_done" are used in exemplary embodiments (exemplary embodiments shown in FIGS. 5 and 6) in a case where there is an error in the main scanning output size setting value. In addition, "viDone", "voDone", "out_vsize_err", and "page_done" are used in exemplary embodiments (exemplary embodiments shown in FIGS. 7 and 8) in a case where there is an error in the sub-scanning output size setting value.

Figure 5:
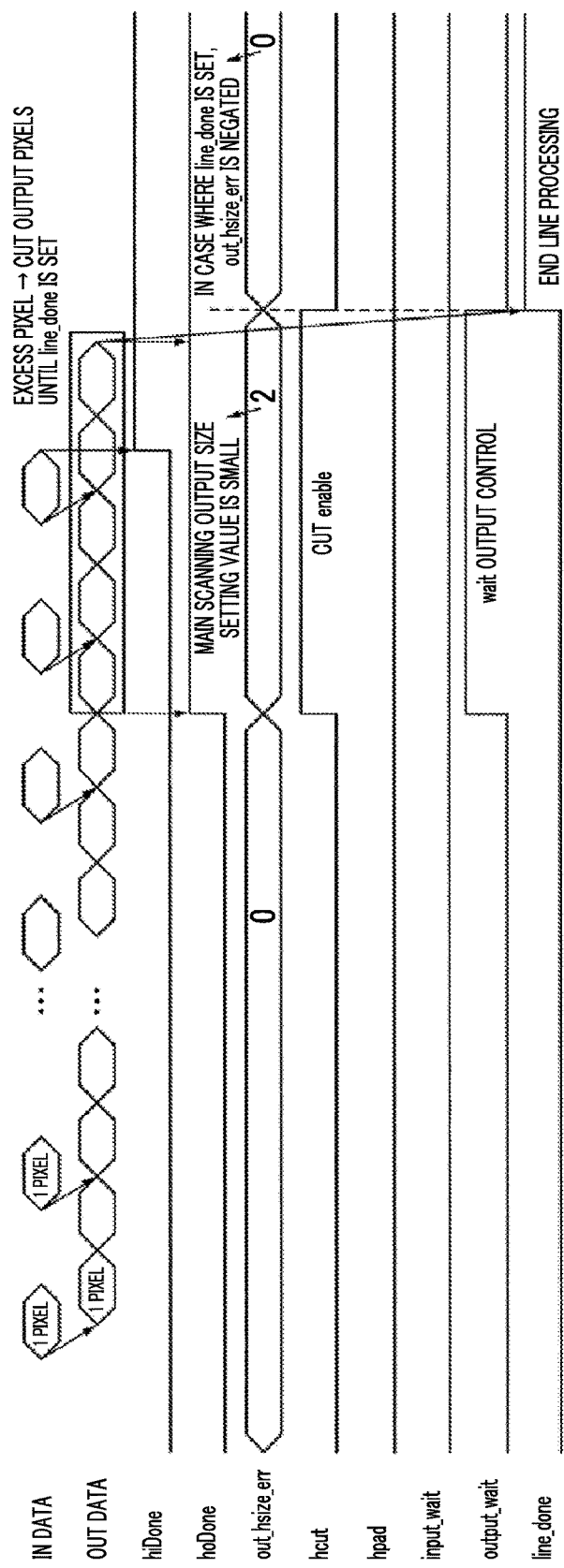
FIG. 5 is a diagram illustrating an exemplary embodiment of the flow of processing in a case where a main scanning output size setting value is smaller than the actual output size.

First, processing in a case where the main scanning output size setting value is smaller than the actual output size will be described with reference to FIG. 5. FIG. 5 is a diagram illustrating an exemplary embodiment of the flow of processing in a case where the main scanning output size setting value is smaller than the actual output size. Here, the following explanation will be given on the assumption that the enlargement and reduction circuit 16b performs processing for enlarging the image data input from the input controller 16a by 200%.

In a case where the input of image data of one line from the input controller 16a to the enlargement and reduction circuit 16b in the main scanning direction is completed, the main scanning input completion signal (hiDone) is set ("1" is set). In a case where the output of image data corresponding to the main scanning output size setting value in the main scanning direction is completed, the main scanning output completion signal (hoDone) is set.

Here, in a case where the main scanning output size setting value is smaller than the actual output size, processing is performed by the enlargement and reduction circuit 16b even after the main scanning output completion signal (hoDone) is set, and the processed image data is output. Since the image data is excess data (excess pixels), it is necessary to cut the image data in order to prevent the DMA transfer from stalling.

Therefore, as shown in FIG. 5, in a case where the main scanning input completion signal (hiDone) is not set even though the main scanning output completion signal (hoDone) is set (in the case of hoDone=1 and hiDone=0), the cut enable signal (hcut) is generated, and pixel cutting is performed by the image cutting/padding unit 16c. Here, after the main scanning output completion signal (hoDone) is set, until the output of image data of one line by the enlargement and reduction circuit 16b ends (that is, until the output size correction detection unit 16e receives the line processing end signal (line_done) from the enlargement and reduction circuit 16b), output pixels are cut.

The error signal (out_hsize_err) having a main scanning output size is generated. In the error signal (out_hsize_err), "2" indicating that the main scanning output size setting value is smaller than the actual output size is set. Then, the output wait signal (output_wait) is set to "1", so that the output of image data by the output controller 16d is awaited.

After the main scanning output completion signal (hoDone) is set, in a case where the line processing end signal (line_done) is received from the enlargement and reduction circuit 16b, the output size correction detection unit 16e sets the line processing end signal (line_done) to "1". In a case where the line processing end signal (line_done) is set to "1", the error signal (out_hsize_err) is negated to "0". Similarly, the cut enable signal (hcut) and the output wait signal (output_wait) are negated to "0".

In this manner, in a case where the main scanning output size setting value is smaller than the actual output size, excess pixels are cut, and the processing of one line is ended.

Figure 6:
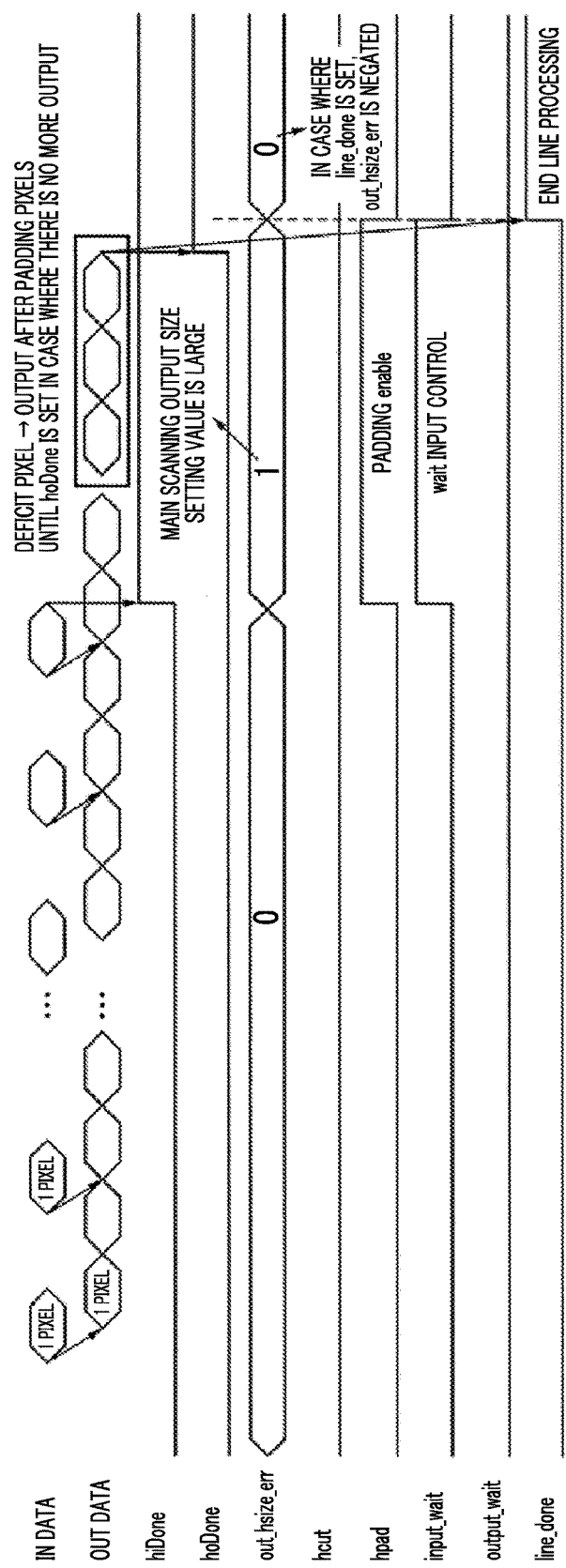
FIG. 6 is a diagram illustrating an exemplary embodiment of the flow of processing in a case where the main scanning output size setting value is larger than the actual output size.

Next, processing in a case where the main scanning output size setting value is larger than the actual output size will be described with reference to FIG. 6. FIG. 6 is a diagram illustrating an exemplary embodiment of the flow of processing in a case where the main scanning output size setting value is larger than the actual output size. Here, as in the exemplary embodiment shown in FIG. 5, the following explanation will be given on the assumption that the enlargement and reduction circuit 16*b* performs processing for enlarging image data by 200%.

In a case where the main scanning output size setting value is larger than the actual output size, the amount of output image data is insufficient. Accordingly, in order to prevent the DMA transfer from stalling, it is necessary to pad pixels in order to compensate for deficient image data.

Therefore, as shown in FIG. 6, in a case where the main scanning output completion signal (hoDone) is not set even though the main scanning input completion signal (hiDone) is set (in the case of hiDone=1 and hoDone=0), the padding enable signal (hpad) is generated, and pixel padding is performed by the image cutting/padding unit 16*c*. Here, after the output of image data by the enlargement and reduction circuit 16*b* is ended, pixels are padded until the main scanning output completion signal (hoDone) is set.

The error signal (out_hsize_err) having a main scanning output size is generated. In the error signal (out_hsize_err), "1" indicating that the main scanning output size setting value is larger than the actual output size is set. Then, the input wait signal (input_wait) is set to "1", so that the input of image data by the input controller 16*a* is awaited.

After the output of image data by the enlargement and reduction circuit 16*b* is ended (that is, the line processing end signal (line_done) is received from the enlargement and reduction circuit 16*b*), in a case where the main scanning output completion signal (hoDone) is set, the output size correction detection unit 16*e* sets the line processing end signal (line_done) to "1". In a case where the line processing end signal (line_done) is set to "1",the error signal (out_hsize_err) is negated to "0". Similarly, the padding enable signal (hpad) and the input wait signal (input_wait) are negated to "0".

In this manner, in a case where the main scanning output size setting value is larger than the actual output size, deficit pixels are padded, and the processing of one line is ended.

Figure 7:
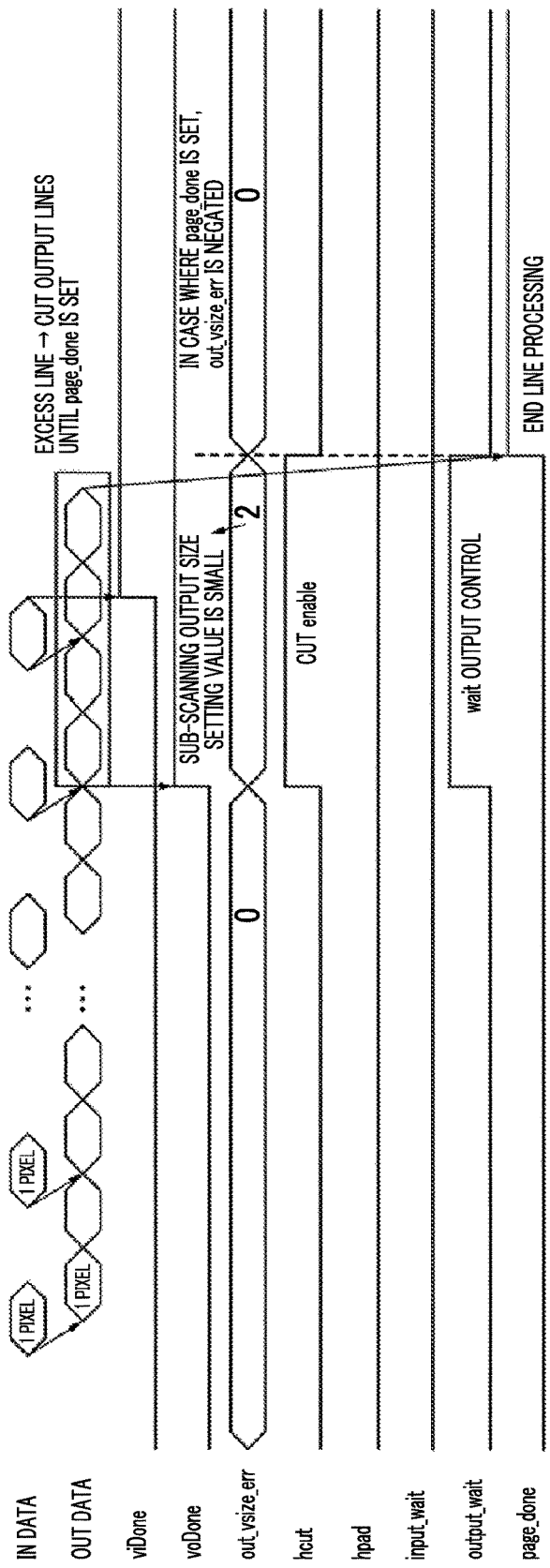
FIG. 7 is a diagram illustrating an exemplary embodiment of the flow of processing in a case where a sub-scanning output size setting value is smaller than the actual output size.

Next, processing in a case where the sub-scanning output size setting value is smaller than the actual output size will be described with reference to FIG. 7. FIG. 7 is a diagram illustrating an exemplary embodiment of the flow of processing in a case where the sub-scanning output size setting value is smaller than the actual output size. Here, as in the exemplary embodiment shown in FIG. 5, the following explanation will be given on the assumption that the enlargement and reduction circuit 16*b* performs processing for enlarging image data by 2000.

As described with reference to FIGS. 5 and 6, in each line, processing for enlarging and reducing image data in the main scanning direction is performed. Then, for example, in a case where the main scanning output size setting value is smaller than the actual output size, excess pixels are cut as shown in FIG. 5. In a case where the main scanning output size setting value is larger than the actual output size, deficit pixels are padded as shown in FIG. 6.

As a result of the processing on each line sequentially performed in this manner, in a case where the input of image data from the input controller 16*a* to the enlargement and reduction circuit 16*b* in the sub-scanning direction is completed, the sub-scanning input completion signal (viDone) is set. In a case where the output of image data corresponding to the sub-scanning output size setting value in the sub-scanning direction is completed, the sub-scanning output completion signal (voDone) is set.

Here, in a case where the sub-scanning output size setting value is smaller than the actual output size, processing is performed by the enlargement and reduction circuit 16*b* even after the sub-scanning output completion signal (voDone) is set, and the processed image data is output. Since the image data is excess data (excess lines), it is necessary to cut the image data in order to prevent the DMA transfer from stalling.

Therefore, as shown in FIG. 7, in a case where the sub-scanning input completion signal (viDone) is not set even though the sub-scanning output completion signal (voDone) is set (in the case of voDone=1 and viDone=0), the cut enable signal (hcut) is generated, and pixel cutting is performed by the image cutting/padding unit 16*c*. Here, after the sub-scanning output completion signal (voDone) is set, output lines are cut until the output of image data of the last line by the enlargement and reduction circuit 16*b* is ended.

The error signal (out_vsize_err) of the sub-scanning output size is generated. In the error signal (out_vsize_err), "2" indicating that the sub-scanning output size setting value is smaller than the actual output size is set. Then, the output wait signal (output_wait) is set to "1", so that the output of image data by the output controller 16*d* is awaited.

After the sub-scanning output completion signal (voDone) is set, in a case where the page processing end signal (page_done) is received from the enlargement and reduction circuit 16*b*, the output size correction detection unit 16*e* sets the page processing end signal (page_done) to "1". In a case where the page processing end signal (page_done) is set to "1", the error signal (out_vsize_err) is negated to "0". Similarly, the cut enable signal (hcut) and the output wait signal (output_wait) are negated to "0".

In this manner, in a case where the sub-scanning output size setting value is smaller than the actual output size, excess lines are cut, and the processing is performed up to the last line of the image data input from the DMAC 14.

Figure 8:
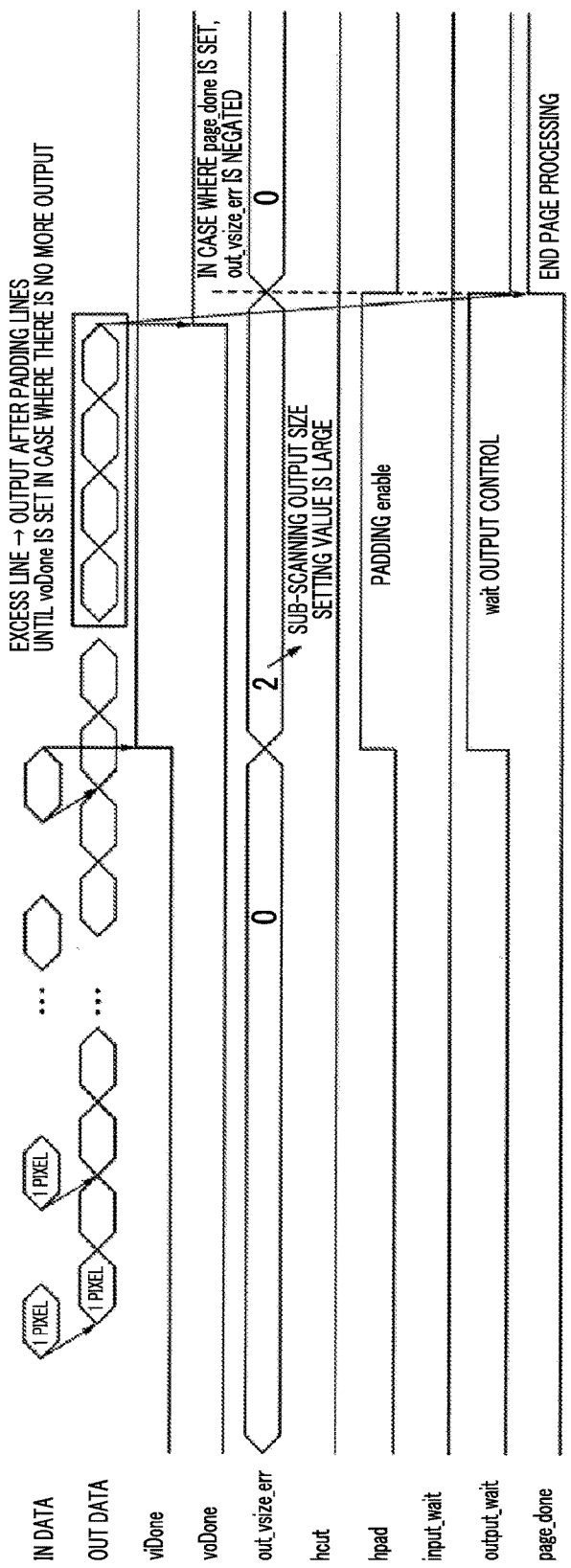
FIG. 8 is a diagram illustrating an exemplary embodiment of the flow of processing in a case where the sub-scanning output size setting value is larger than the actual output size.

Next, processing in a case where the sub-scanning output size setting value is larger than the actual output size will be described with reference to FIG. 8. FIG. 8 is a diagram illustrating an exemplary embodiment of the flow of processing in a case where the sub-scanning output size setting value is larger than the actual output size. Here, as in the exemplary embodiment shown in FIG. 5, the following explanation will be given on the assumption that the enlargement and reduction circuit 16*b* performs processing for enlarging image data by 200%.

In a case where the sub-scanning output size setting value is larger than the actual output size, the amount of output image data is insufficient. Accordingly, in order to prevent the DMA transfer from stalling, it is necessary to pad image data in units of a line in order to compensate for deficient image data.

Therefore, as shown in FIG. 8, in a case where the sub-scanning output completion signal (voDone) is not set even though the sub-scanning input completion signal (viDone) is set (in the case of viDone=1 and voDone=0), the padding enable signal (hpad) is generated, and image data padding is performed in units of a line by the image cutting/padding unit 16c. Here, after the output of image data by the enlargement and reduction circuit 16b is ended, image data is padded until the sub-scanning output completion signal (voDone) is set.

The error signal (out_vsize_err) of the sub-scanning output size is generated. In the error signal (out_vsize_err), "1" indicating that the sub-scanning output size setting value is larger than the actual output size is set. Then, the input wait signal (input_wait) is set to "1", so that the input of image data by the input controller 16a is awaited.

After the output of image data by the enlargement and reduction circuit 16b is ended (that is, the page processing end signal (page_done) is received from the enlargement and reduction circuit 16b), in a case where the sub-scanning output completion signal (voDone) is set, the output size correction detection unit 16e sets the page processing end signal (page_done) to "1". In a case where the page processing end signal (page_done) is set to "1", the error signal (out_vsize_err) is negated to "0". Similarly, the padding enable signal (hpad) and the input wait signal (input_wait) are negated to "0".

In this manner, in a case where the sub-scanning output size setting value is larger than the actual output size, deficient lines are padded, and the processing is performed up to the last line of the image data output to the DMAC 14.

Processing Procedure in Sub-Scanning Direction

Figure 9B:
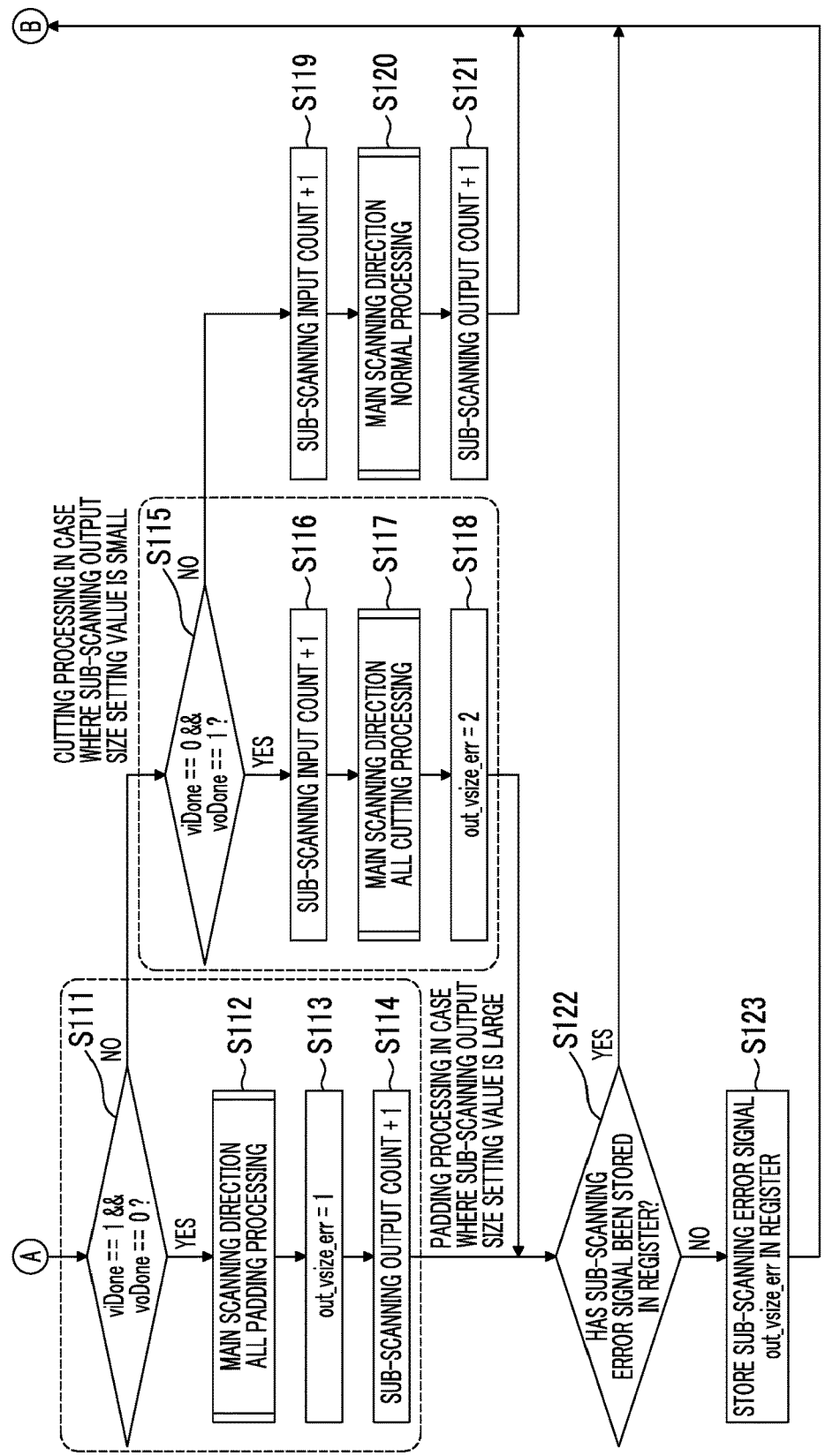
FIG. 9B is a flowchart showing an exemplary embodiment of the procedure of processing in the sub-scanning direction.

As described above, in the image core 16, processing in the sub-scanning direction is performed on image data in units of a line. In each line, processing in the main scanning direction is performed in units of a pixel. Here, the processing procedure in the sub-scanning direction will be described with reference to FIGS. 9A and 9B. FIGS. 9A and 9B are flowcharts showing an exemplary embodiment of the procedure of processing in the sub-scanning direction.

First, the input controller 16a resets an input count in the sub-scanning direction (hereinafter, referred to as a sub-scanning input count), and the output controller 16d resets an output count in the sub-scanning direction (hereinafter, referred to as a sub-scanning output count) (step 101). Here, the sub-scanning input count is reset to "0". Similarly, the sub-scanning output count is reset to "0".

Then, the input controller 16a determines whether or not the input of image data to the enlargement and reduction circuit 16b in the sub-scanning direction has been completed (step 102). Here, the input controller 16a determines whether or not all of the image data transmitted from the DMAC 14, in the sub-scanning direction, has been input to the enlargement and reduction circuit 16b up to the last line.

More specifically, the input controller 16a compares the sub-scanning input count with the sub-scanning input size setting value. In a case where the sub-scanning input count is smaller than the sub-scanning input size setting value, it is determined that the input of image data has not been completed (NO in step 102). On the other hand, in a case where the sub-scanning input count and the sub-scanning input size setting value are the same, it is determined that the input of image data has been completed (YES in step 102).

In a case where a positive determination (YES) is made in step 102, the input controller 16a sets "viDone" to "1" (step 103). In other words, the input controller 16a outputs a sub-scanning input completion signal (viDone=1), which indicates that the input of image data in the sub-scanning direction has been completed, to the output size correction detection unit 16e. On the other hand, in a case where a negative determination (NO) is made in step 102, the input controller 16a sets "viDone" to "0" (keeps "0" without setting "viDone") (step 104).

Then, the output controller 16d determines whether or not the output of image data corresponding to the sub-scanning output size setting value in the sub-scanning direction has been completed (step 105). Here, the output controller 16d determines whether or not all of the image data corresponding to the sub-scanning output size setting value has been output to the DMAC 15 in the sub-scanning direction.

More specifically, the output controller 16d compares the sub-scanning output count with the sub-scanning output size setting value. In a case where the sub-scanning output count is smaller than the sub-scanning output size setting value, it is determined that the output of image data has not been completed (NO in step 105). On the other hand, in a case where the sub-scanning output count and the sub-scanning output size setting value are the same, it is determined that the output of image data has been completed (YES in step 105).

In a case where a positive determination (YES) is made in step 105, the output controller 16d sets "voDone" to "1" (step 106). In other words, the output controller 16d outputs a sub-scanning output completion signal (voDone=1), which indicates that the output of image data in the sub-scanning direction has been completed, to the output size correction detection unit 16e. On the other hand, in a case where a negative determination (NO) is made in step 105, the output controller 16d sets "voDone" to "0" (keeps "0" without setting "voDone") (step 107).

Then, the output size correction detection unit 16e determines whether or not both "voDone" and "voDone" are "1" (step 108). In a case where a positive determination (YES) is made in step 108, the output size correction detection unit 16e determines whether or not "page_done" is "1" (step 109). Here, in a case where "voDone" is "1" and the page processing end signal (page_done) is received from the enlargement and reduction circuit 16b, the output size correction detection unit 16e sets "page_done" to "1", and makes a positive determination (YES) in step 109. On the other hand, in a case where the page processing end signal (page_done) is not received from the enlargement and reduction circuit 16b, the output size correction detection unit 16e makes a negative determination (NO) in step 109, and waits until the page processing end signal is received.

In a case where a positive determination (YES) is made in step 109, various signals, in other words, the error signal (out_vsize_err) of the sub-scanning output size, the cut enable signal (hcut), the padding enable signal (hpad), the input wait signal (input_wait), and the output wait signal (output_wait) are negated to "0" (step 110). Then, the process flow ends.

In a case where a negative determination (NO) is made in step 108, the output size correction detection unit 16e determines whether or not "viDone" is "1" and "voDone" is "0" (step 111).

In a case where a positive determination (YES) is made in step 111, main scanning direction all padding processing is performed (step 112). Details of the main scanning direction all padding processing will be described later. After the main scanning direction all padding processing is ended, the output size correction detection unit 16e outputs the error signal (out_vsize_err), which is set to "1" indicating that the sub-scanning output size setting value is larger than the actual output size, to the register 17 (step 113). Then, the output controller 16d increases the sub-scanning output count by "1" (step 114). Then, the process proceeds to step 122 to be described later.

In a case where a negative determination (NO) is made in step 111, the output size correction detection unit 16e determines whether or not "viDone" is "0" and "voDone" is "1" (step 115).

In a case where a positive determination (YES) is made in step 115, the input controller 16a increases the sub-scanning output count by "1" (step 116). Then, for the next one line, main scanning direction all cutting processing is performed (step 117). Details of the main scanning direction all cutting processing will be described later. After the main scanning direction all cutting processing is ended, the output size correction detection unit 16e outputs the error signal (out_vsize_err), which is set to "2" indicating that the sub-scanning output size setting value is smaller than the actual output size, to the register 17 (step 118). Then, the process proceeds to step 122 to be described later.

In a case where a negative determination (NO) is made in step 115, that is, in a case where it is determined that both "viDone" and "voDone" is "0", the input controller 16a increases the sub-scanning output count by "1" (step 119). Then, for the next one line, main scanning direction normal processing is performed (step 120). Details of the main scanning direction normal processing will be described later. After the main scanning direction normal processing is ended, the output controller 16d increases the sub-scanning output count by "1" (step 121). Then, the process proceeds to step 102.

After step 114 or after step 118, the output size correction detection unit 16e determines whether or not the error signal of the sub-scanning output size has been stored in the register 17 (step 122).

In a case where a negative determination (NO) is made in step 122, the output size correction detection unit 16e outputs the error signal (out_vsize_err) of the sub-scanning output size to the register 17 so as to be stored therein (step 123). Here, the error signal (out_vsize_err) set to "1" is stored in a case where the processing of step 113 is performed, and the error signal (out_vsize_err) set to "2" is stored in a case where the processing of step 118 is performed. In a case where a positive determination (YES) is made in step 122 or after step 123, the process proceeds to step 102.

In this manner, based on the values of "viDone" and "voDone", the main scanning direction all padding processing, the main scanning direction all cutting processing, or the main scanning direction normal processing is performed for each line in the sub-scanning direction. Then, padding processing is performed in a case where the sub-scanning output size setting value is larger than the actual output size, and cutting processing is performed in a case where the sub-scanning output size setting value is smaller than the actual output size.

Procedure of Main Scanning Direction Normal Processing

Figure 10A:
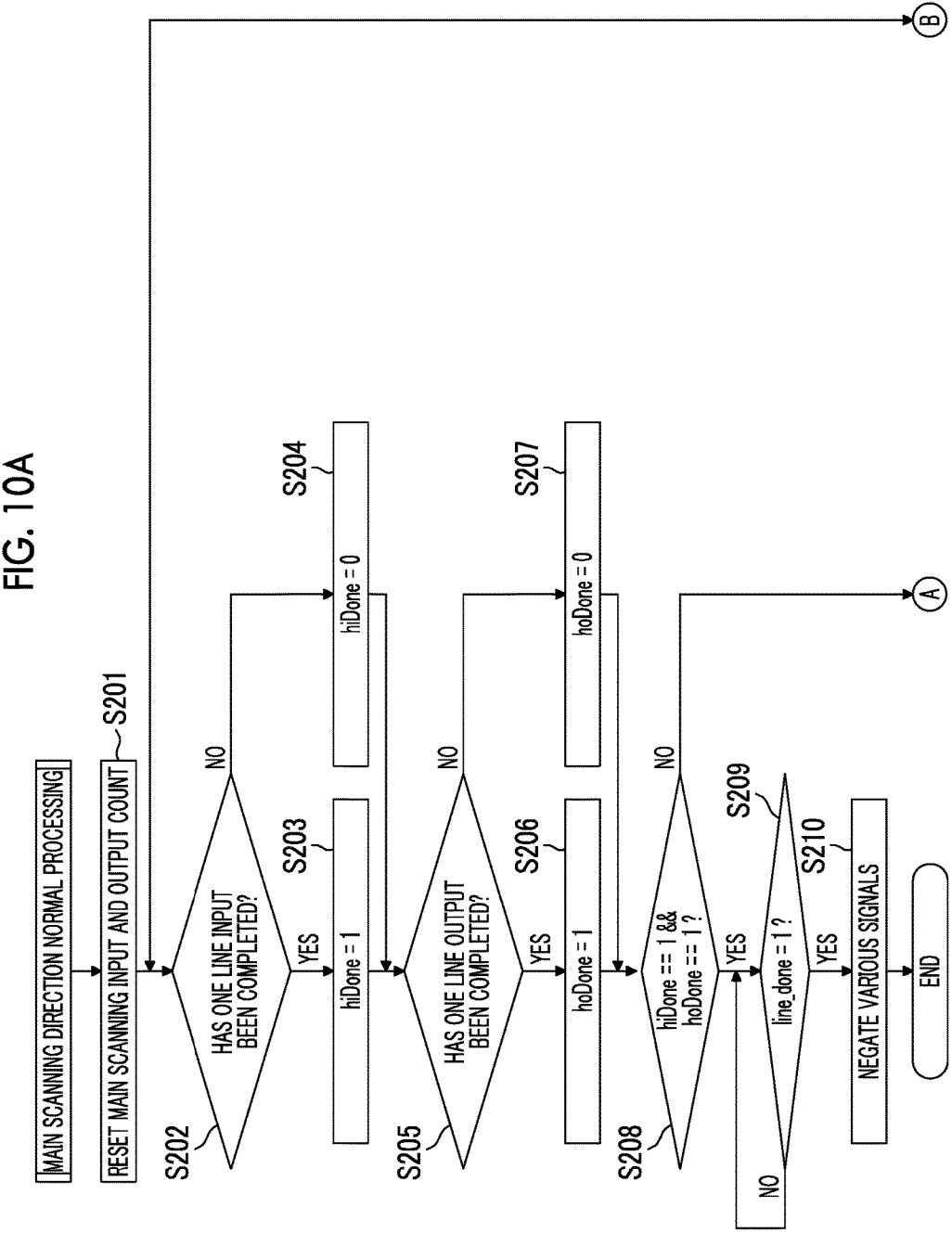
FIG. 10A is a flowchart showing an exemplary embodiment of the procedure of main scanning direction normal processing.

Next, the procedure of the main scanning direction normal processing will be described. FIGS. 10A and 10B are flowcharts showing an exemplary embodiment of the procedure of the main scanning direction normal processing. A series of processes shown in FIGS. 10A and 10B correspond to the processing of step 120 in FIG. 9B.

First, the input controller 16a resets an input count in the main scanning direction (hereinafter, referred to as a main scanning input count), and the output controller 16d resets an output count in the main scanning direction (hereinafter, referred to as a main scanning output count) (step 201). Here, the main scanning input count is reset to "0". Similarly, the main scanning output count is reset to "0".

Then, the input controller 16a determines whether or not the input of image data of one line to the enlargement and reduction circuit 16b in the main scanning direction has been completed (step 202). Here, the input controller 16a determines whether or not all of the image data of one line transmitted from the DMAC 14, in the main scanning direction, has been input to the enlargement and reduction circuit 16b.

More specifically, the input controller 16a compares the main scanning input count with the main scanning input size setting value. In a case where the main scanning input count is smaller than the main scanning input size setting value, it is determined that the input of image data has not been completed (NO in step 202). On the other hand, in a case where the main scanning input count and the main scanning input size setting value are the same, it is determined that the input of image data has been completed (YES in step 202).

In a case where a positive determination (YES) is made in step 202, the input controller 16a sets "hiDone" to "1" (step 203). In other words, the input controller 16a outputs a main scanning input completion signal (hiDone=1), which indicates that the input of image data in the main scanning direction has been completed, to the output size correction detection unit 16e. On the other hand, in a case where a negative determination (NO) is made in step 202, the input controller 16a sets "hiDone" to "0" (keeps "0" without setting "hiDone") (step 204).

Then, the output controller 16d determines whether or not the output of image data corresponding to the main scanning output size setting value in the main scanning direction has been completed (step 205). Here, the output controller 16d determines whether or not all of the image data corresponding to the main scanning output size setting value has been output to the DMAC 15 in the main scanning direction.

More specifically, the output controller 16d compares the main scanning output count with the main scanning output size setting value. In a case where the main scanning output count is smaller than the main scanning output size setting value, it is determined that the output of image data has not been completed (NO in step 205). On the other hand, in a case where the main scanning output count and the main scanning output size setting value are the same, it is determined that the output of image data has been completed (YES in step 205).

In a case where a positive determination (YES) is made in step 205, the output controller 16d sets "hoDone" to "1" (step 206). In other words, the output controller 16d outputs a main scanning output completion signal (hoDone=1), which indicates that the output of image data of one line in the main scanning direction has been completed, to the output size correction detection unit 16e. On the other hand, in a case where a negative determination (NO) is made in step 205, the output controller 16d sets "hoDone" to "0" (keeps "0" without setting "hoDone") (step 207).

Then, the output size correction detection unit 16e determines whether or not both "hiDone" and "hoDone" are "1" (step 208).

In a case where a positive determination (YES) is made in step 208, the output size correction detection unit 16e determines whether or not "line_done" is "1" (step 210). Here, in a case where "hoDone" is "1" and the line processing end signal (line_done) is received from the enlargement and reduction circuit 16b, the output size correction detection unit 16e sets "line_done" to "1", and makes a positive determination (YES) in step 209. On the other hand, in a case where the line processing end signal (line_done) is not received from the enlargement and reduction circuit 16b, the output size correction detection unit 16e makes a negative determination (NO) in step 209, and waits until the line processing end signal is received.

In a case where a positive determination (YES) is made in step 209, various signals, in other words, the error signal (out_hsize_err) of the main scanning output size, the cut enable signal (hcut), the padding enable signal (hpad), the input wait signal (input_wait), and the output wait signal (output_wait) are negated to "0" (step 210). Then, the process flow ends.

In a case where a negative determination (NO) is made in step 208, the output size correction detection unit 16e determines whether or not "hiDone" is "1" and "hoDone" is "0" (step 211).

In a case where a positive determination (YES) is made in step 211, the output size correction detection unit 16e sets the input wait signal (input_wait) to "1" and outputs the input wait signal (input_wait) to the input controller 16a, so that the input of image data is awaited until the output in the main scanning direction is completed (step 212). Then, the output size correction detection unit 16e outputs the error signal (out_hsize_err), which is set to "1" indicating that the main scanning output size setting value is larger than the actual output size, to the register 17 (step 213).

Then, the output size correction detection unit 16e outputs the padding enable signal (hpad) to the image cutting/padding unit 16c so that pixels are padded until the output in the main scanning direction is completed. Then, the image cutting/padding unit 16c pads and outputs one pixel (step 214). Then, the output controller 16d increases the main scanning output count by "1" (step 215). Then, the process proceeds to step 228 to be described later.

In a case where a negative determination (NO) is made in step 211, the output size correction detection unit 16e determines whether or not "hiDone" is "0" and "hoDone" is "1" (step 216).

In a case where a positive determination (YES) is made in step 216, one pixel is input to the enlargement and reduction circuit 16b from the input controller 16a, and the enlargement and reduction circuit 16b reads one pixel input from the input controller 16a (step 217). Then, the input controller 16a increases the main scanning input count by "1" (step 218). Then, the enlargement and reduction circuit 16b performs enlargement or reduction processing on the read one pixel (step 219).

Then, the output size correction detection unit 16e outputs the error signal (out_hsize_err), which is set to "2" indicating that the main scanning output size setting value is smaller than the actual output size, to the register 17 (step 220). Then, the output size correction detection unit 16e outputs the cut enable signal (hcut) to the image cutting/padding unit 16c so that pixels are cut until the input in the main scanning direction is completed (that is, until the page processing end signal (page_done) is received). Then, the image cutting/padding unit 16c cuts the pixel from the enlargement and reduction circuit 16b (step 221).

Then, the output size correction detection unit 16e sets the output wait signal (output_wait) to "1" and outputs the output wait signal (output_wait) to the output controller 16d, so that the output of image data is awaited until the input in the main scanning direction is completed (step 222). Then, the process proceeds to step 228 to be described later.

In a case where a negative determination (NO) is made in step 216, that is, in a case where it is determined that both "hiDone" and "hoDone" are "0", one pixel is input to the enlargement and reduction circuit 16b from the input controller 16a, and the enlargement and reduction circuit 16b reads one pixel input from the input controller 16a (step 223). Then, the input controller 16a increases the main scanning input count by "1" (step 224). Then, the enlargement and reduction circuit 16b performs enlargement or reduction processing on the read one pixel (step 225).

Then, the image cutting/padding unit 16c outputs the pixel transmitted from the enlargement and reduction circuit 16b to the output controller 16d as it is (step 226). Then, the output controller 16d increases the main scanning output count by "1" (step 227). Then, the process proceeds to step 202.

After step 215 or after step 222, the output size correction detection unit 16e determines whether or not the error signal of the main scanning output size has been stored in the register 17 (step 228).

In a case where a negative determination (NO) is made in step 228, the output size correction detection unit 16e outputs the error signal (out_hsize_err) of the main scanning output size to the register 17 so as to be stored therein (step 229). Here, the error signal (out_hsize_err) set to "1" is stored in a case where the processing of step 213 is performed, and the error signal (out_hsize_err) set to "2" is stored in a case where the processing of step 220 is performed. In a case where a positive determination (YES) is made in step 228 or after step 229, the process proceeds to step 202.

In this manner, processing is performed on the image data of one line based on the values of "hiDone" and "hoDone". Then, padding processing is performed in a case where the main scanning output size setting value is larger than the actual output size, and cutting processing is performed in a case where the main scanning output size setting value is smaller than the actual output size.

Main Scanning Direction all Cutting Processing

Figure 11:
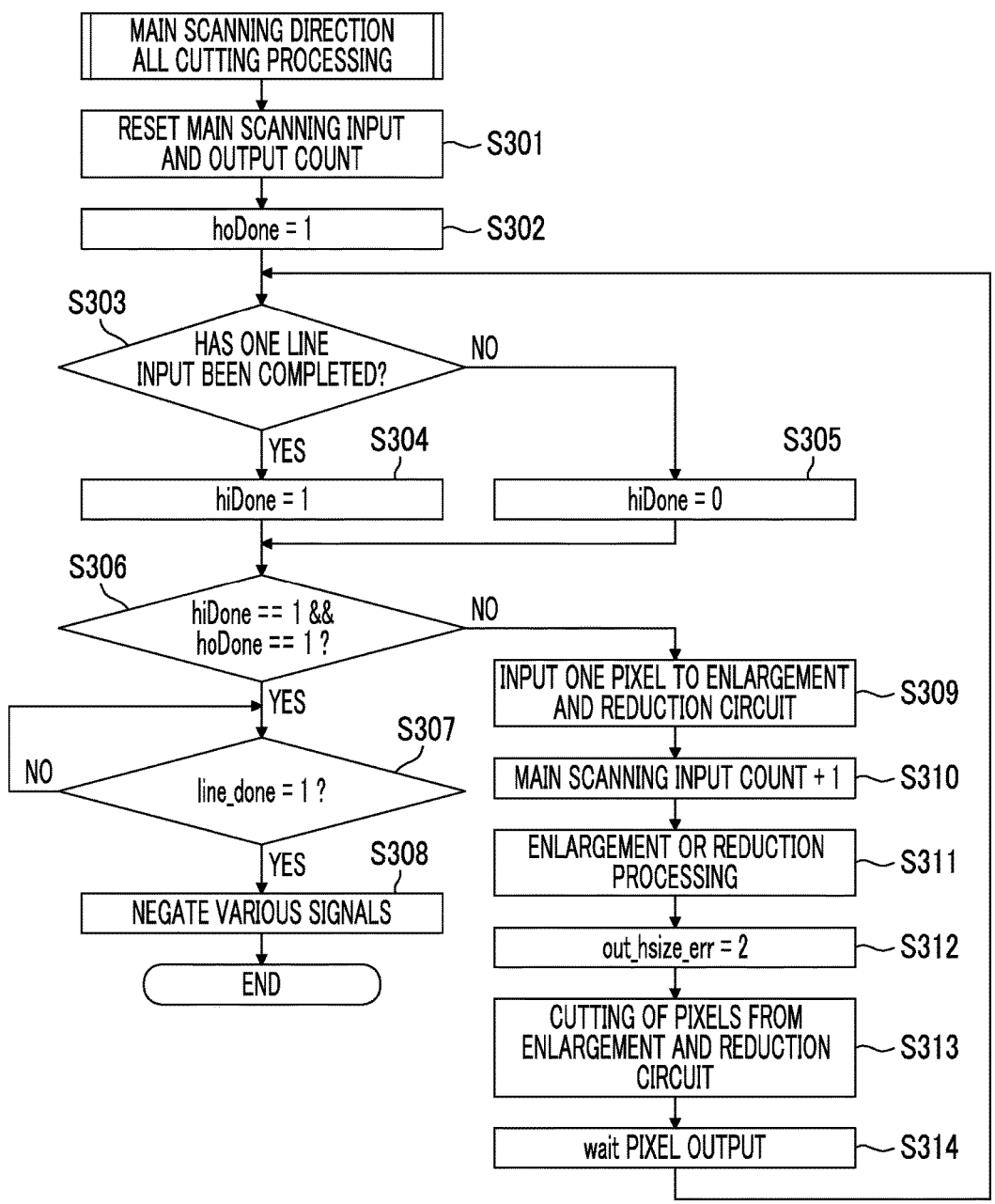
FIG. 11 is a flowchart showing an exemplary embodiment of the procedure of main scanning direction all cutting processing.

Next, the procedure of the main scanning direction all cutting processing will be described. The main scanning direction all cutting processing is processing for cutting all pixels of one line in the case of "viDone=O" and "voDone=1", in other words, in a case where image data is output from the enlargement and reduction circuit 16b even though the output of image data corresponding to the setting value (corresponding to the setting line) in the sub-scanning direction has been completed. FIG. 11 is a flowchart showing an exemplary embodiment of the procedure of the main scanning direction all cutting processing. A series of processes shown in FIG. 11 correspond to the processing of step 117 in FIG. 9B.

First, the input controller 16a resets the main scanning input count, and the output controller 16d resets the main scanning output count (step 301). Here, the main scanning input count is reset to "0". Similarly, the main scanning output count is reset to "0".

Then, the input controller 16a sets "hoDone" to "1" (step 302). Processing of the next steps 303 to 305 and processing of the next steps 306 to 308 are the same as the processing of steps 202 to 204 and steps 208 to 210 in FIG. 10A.

That is, in a case where it is determined that the input of image data of one line has been completed (YES in step 303), "hiDone" is set to "1" (step 304), and a positive determination (YES) is made in step 306. Then, in a case where the output size correction detection unit 16e receives the line processing end signal (line_done) from the enlargement and reduction circuit 16b (YES in step 307), various signals are negated to "0" (step 308). Then, the process flow ends.

On the other hand, in a case where it is determined that the input of image data of one line has not been completed in step 303 (NO in step 303), a negative determination (NO) is made in step 306. Then, processing of steps 309 to 314 is performed. The processing of steps 309 to 314 is the same as the processing of steps 217 to 222 in FIG. 10B. That is, after one pixel is input to the enlargement and reduction circuit 16b and enlargement and reduction processing is performed by the enlargement and reduction circuit 16b, the pixel after enlargement and reduction is cut.

In this manner, all pixels after enlargement and reduction that are output from the enlargement and reduction circuit 16b are cut until the input of image data of one line in the main scanning direction is completed. Then, in a case where the input of image data of one line is completed, the main scanning direction all cutting processing is ended.

Procedure of Main Scanning Direction all Padding Processing

Figure 12:
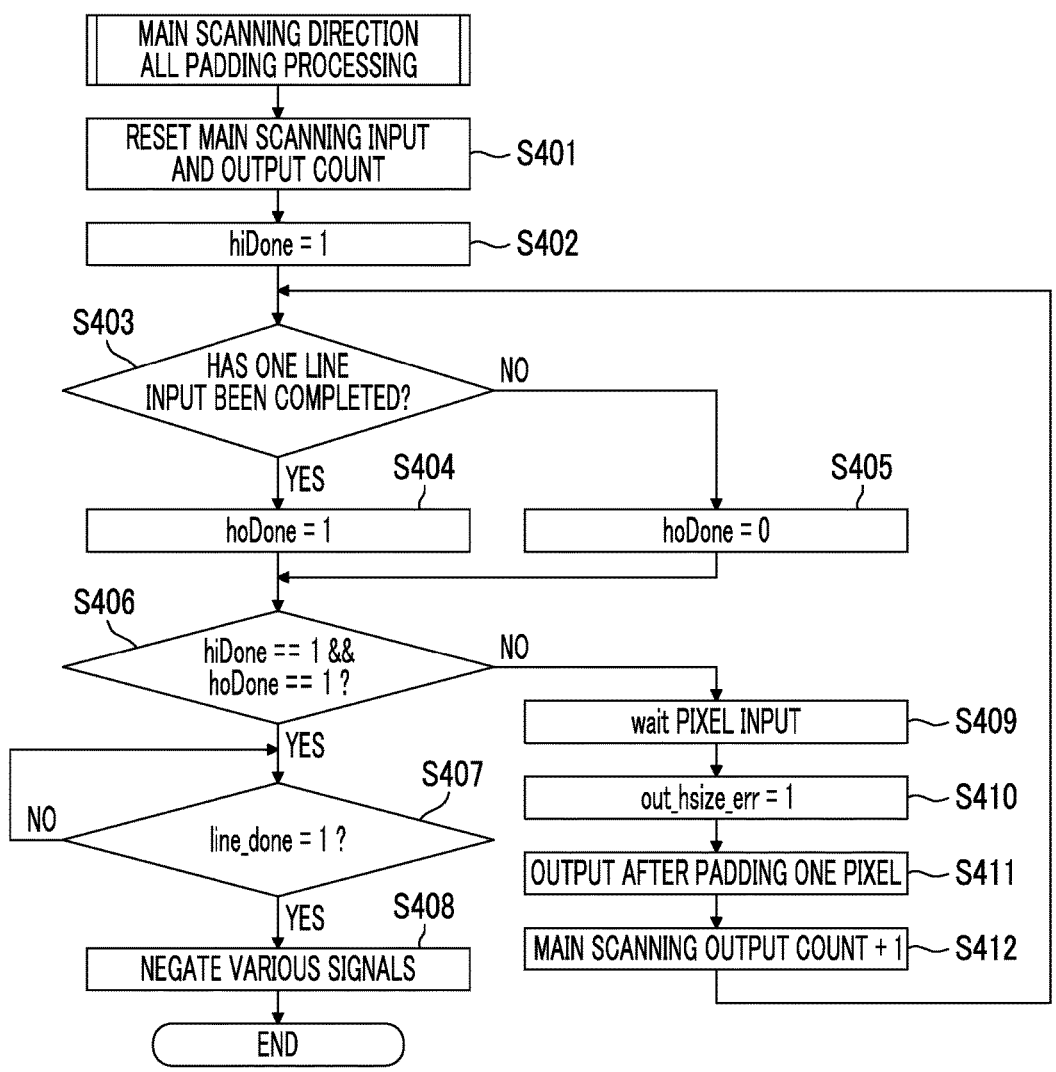
FIG. 12 is a flowchart showing an exemplary embodiment of the procedure of main scanning direction all padding processing.

Next, the procedure of the main scanning direction all padding processing will be described. The main scanning direction all padding processing is processing for padding all pixels of one line in the case of "viDone=1" and "voDone=0", in other words, in a case where the output of image data corresponding to the setting value (corresponding to the setting line) is not completed even though the input of image data to the enlargement and reduction circuit 16b in the sub-scanning direction has been completed. FIG. 12 is a flowchart showing an exemplary embodiment of the procedure of the main scanning direction all padding processing. A series of processes shown in FIG. 12 correspond to the processing of step 112 in FIG. 9B.

First, the input controller 16a resets the main scanning input count, and the output controller 16d resets the main scanning output count (step 401). Here, the main scanning input count is reset to "0". Similarly, the main scanning output count is reset to "0".

Then, the output controller 16d sets "hiDone" to "1" (step 402). Processing of the next steps 403 to 405 and processing of the next steps 406 to 408 are the same as the processing of steps 205 to 207 and steps 208 to 210 in FIG. 10A.

That is, in a case where it is determined that the output of image data of one line has been completed (YES in step 403), "hoDone" is set to "1" (step 404), and a positive determination (YES) is made in step 406. In the main scanning direction all padding processing, the enlargement and reduction circuit 16b does not perform enlargement and reduction processing. Therefore, in a case where "hoDone" is set to "1", the output size correction detection unit 16e sets "line_done" to "1", and makes a positive determination (YES) in step 407. Then, various signals are negated to "0" (step 408), and the process flow ends.

On the other hand, in a case where it is determined that the output of image data of one line has not been completed in step 403 (NO in step 403), a negative determination (NO) is made in step 406. Then, processing of steps 409 to 412 is performed. The processing of steps 409 to 412 is the same as the processing of steps 212 to 215 in FIG. 10B. That is, the image cutting/padding unit 16c pads one pixel and outputs the result to the output controller 16d.

In this manner, padding is performed pixel by pixel until the output of image data of one line (image data of the main scanning output size setting value) in the main scanning direction is completed. Then, in a case where the output of image data of one line is completed, the main scanning direction all padding processing is ended.

Specific Exemplary Embodiment of Image Cutting/Padding Processing

Next, processing for cutting and padding image data will be described by way of a specific exemplary embodiment.

Figure 13B:
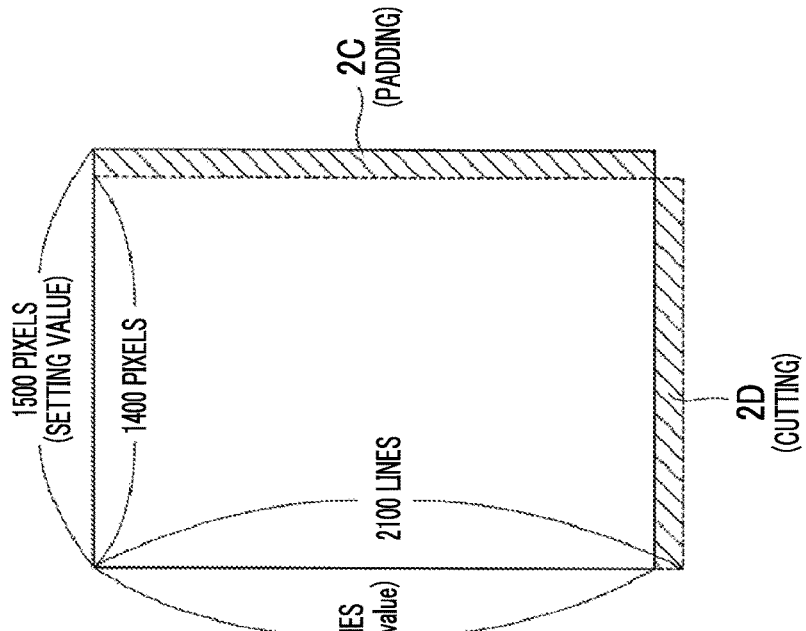
FIGS. 13A and 13B are diagrams illustrating specific exemplary embodiments of the processing for cutting or padding image data.
Figure 13A:
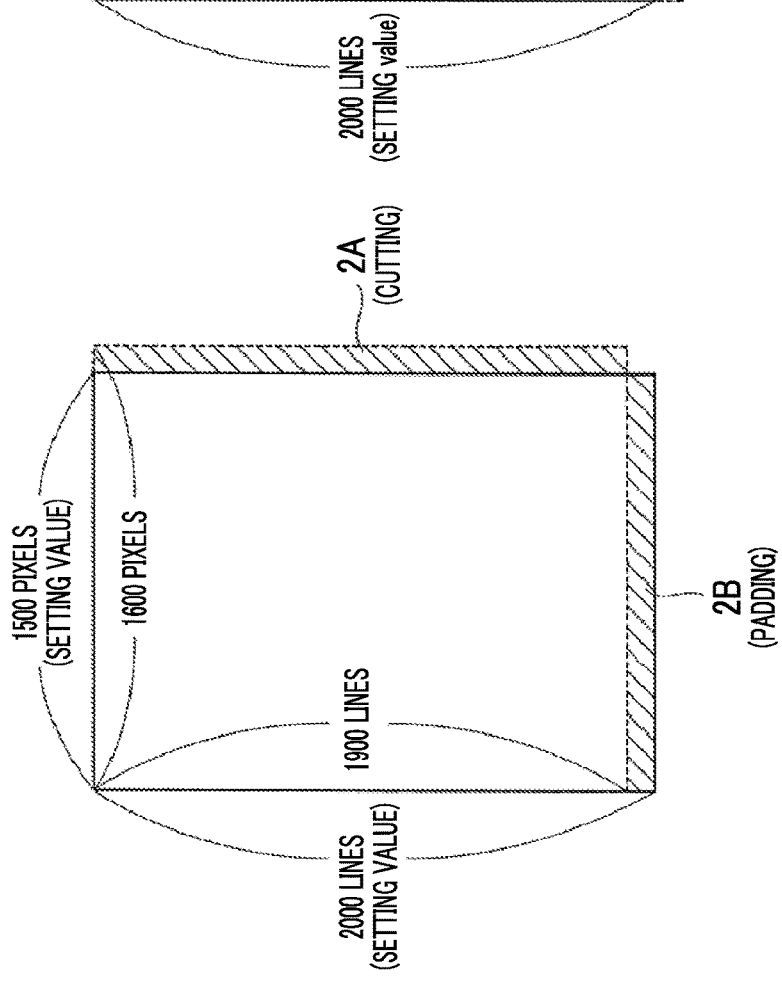

FIGS. 13A and 13B are diagrams illustrating specific exemplary embodiments of the processing for cutting and padding image data. It is assumed that steps shown below correspond to the respective steps in FIGS. 9A to 12.

A first specific exemplary embodiment will be described with reference to FIG. 13A.

In the exemplary embodiment shown in FIG. 13A, it is assumed that, in a case where the setting value of image data after processing by the enlargement and reduction circuit 16b is 1500 pixels×2000 lines, image data of 1600 pixels× 1900 lines is actually generated. That is, this is an operation exemplary embodiment in a case where the main scanning output size setting value (1500 pixels) is smaller than the actual output size (1600 pixels) and the sub-scanning output size setting value (2000 lines) is larger than the actual output size (1900 lines).

First, the processing is sequentially performed from the first line of the image data. Here, the main scanning direction normal processing of step 120 in FIG. 9B is sequentially performed, and the processed pixels are output from the enlargement and reduction circuit 16b. Then, in a case where 1500 pixels of the first line are output, the main scanning output count and the main scanning output size setting value become the same, and the output of the image data corresponding to the main scanning output size setting value is completed (YES in step 205). Then, "hoDone" is set to "1" (step 206).

As a result, "hiDone=0" and "hoDone=1" are set (YES in step 216), and the pixels output from the enlargement and reduction circuit 16b are cut (step 221). Here, one pixel is input to the enlargement and reduction circuit 16b, and the pixels output from the enlargement and reduction circuit 16b are cut. Accordingly, 100 pixels exceeding 1500 pixels are cut. Then, the processing on the first line is ended. Similarly for the second and subsequent lines, 100 pixels exceeding 1500 pixels are cut. Accordingly, pixels of a region 2A with the broken line are cut.

In a case where the processing is completed up to 1900 lines, the sub-main scanning input count and the sub-main scanning input size setting value become the same, and the input of the image data to the enlargement and reduction circuit 16b in the sub-scanning direction is completed (YES in step 102). Then, "viDone" is set to "1" (step 103). As a result, "viDone=1" and "voDone=O" are set (YES in step 111), and the main scanning direction all padding processing is performed (step 112).

In the main scanning direction all padding processing, an image of the main scanning output size setting value (1500 pixels) for one line is padded as processing in the main scanning direction for the 1901st line (step 411). The padding processing is continued until the 2000th line even after the 1902nd line. Accordingly, pixels of a region 2B with the broken line are padded.

Then, in a case where the padding processing is completed up to 2000 lines, the sub-main scanning output count and the sub-scanning output size setting value become the same, and the output of the image data corresponding to the sub-scanning output size setting value is completed (YES in step 105). Then, "voDone" is set to "1" (step 106). As a result, "viDone=1" and "voDone=1" are set (YES in step 108), and the processing of steps 109 and 110 is performed and the entire processing is ended.

In this manner, cutting or padding of image data is performed, and image data of 1500 pixels×2000 lines that is a setting value is output from the image core 16 to the DMAC 15.

Next, a second specific exemplary embodiment will be described with reference to FIG. 13B.

In the exemplary embodiment shown in FIG. 13B, it is assumed that, in a case where the setting value of image data after processing by the enlargement and reduction circuit 16b is 1500 pixels×2000 lines, image data of 1400 pixels× 2100 lines is actually generated. That is, this is an operation exemplary embodiment in a case where the main scanning output size setting value (1500 pixels) is larger than the actual output size (1400 pixels) and the sub-scanning output size setting value (2000 lines) is smaller than the actual output size (2100 lines).

First, as in the exemplary embodiment shown in FIG. 13A, the processing is sequentially performed from the first line of the image data. Then, in a case where 1400 pixels of the first line are output, the main scanning input count and the main scanning input size setting value become the same, and the input of the image data to the enlargement and reduction circuit 16b in the main scanning direction is completed (YES in step 202). Then, "hiDone" is set to "1" (step 203).

As a result, "hiDone=1" and "hoDone=O" are set (YES in step 211), and pixel padding is performed (step 214). Here, 100 pixels exceeding 1400 pixels are padded so that the first line becomes the main scanning output size setting value (1500 pixels). Then, the processing on the first line is ended. Similarly for the second and subsequent lines, 100 pixels exceeding 1400 pixels are padded. Accordingly, pixels of a region 2C with the broken line are padded.

In a case where the processing is completed up to 2000 lines, the sub-main scanning output count and the sub-scanning output size setting value become the same, and the output of the image data corresponding to the sub-scanning output size setting value is completed (YES in step 105). Then, "voDone" is set to "1" (step 106). As a result, "viDone=0" and "voDone=1" are set (YES in step 115), and the main scanning direction all cutting processing is performed (step 118).

In the main scanning direction all cutting processing, 1400 pixels of one line output from the enlargement and reduction circuit 16b are cut as processing in the main scanning direction for the 2001st line (step 313). The cutting processing is continued until the 2100th line even after the 2002nd line. Accordingly, pixels of a region 2D with the broken line are cut.

In a case where the cutting processing is completed up to 2100 lines, the sub-main scanning input count and the sub-main scanning input size setting value become the same, and the input of the image data to the enlargement and reduction circuit 16b in the sub-scanning direction is completed (YES in step 102). Then, "viDone" is set to "1" (step 103). As a result, "viDone=1" and "voDone=1" are set (YES in step 108), and the processing of steps 109 and 110 is performed and the entire processing is ended.

In this manner, cutting or padding of image data is performed, and image data of 1500 pixels×2000 lines that is a setting value is output from the image core 16 to the DMAC 15.

As described above, the image core 16 according to the present exemplary embodiment performs pixel cutting or pixel padding so that image data having a size of a setting value (the main scanning output size setting value and the sub-scanning output size setting value) is output to the DMAC 15. For example, even in a case where the user selects any magnification, such as a magnification not recommended by the image processing apparatus 100, to enlarge or reduce image data, the image core 16 performs pixel cutting or pixel padding so that image data having a size of a setting value is output. As described above, in a case where the designated magnification is a magnification at which stalling may occur in the DMA transfer, the image core 16 changes the size of an image to be output to a size that does not cause stalling in the input or output through the DMA transfer, thereby performing control to suppress the occurrence of stalling.

Another Configuration Exemplary Embodiment

Next, another configuration exemplary embodiment of the image processing apparatus 100 according to the present exemplary embodiment will be described. In the exemplary embodiment shown in FIG. 4, a stall prevention mechanism is provided inside the image core 16. In another configuration exemplary embodiment, however, the stall prevention mechanism is provided outside the image core 16. For example, in a case where it is not possible to mount the stall prevention mechanism inside the image core 16 due to the configuration of the image core 16, another configuration example is used.

Figure 14:
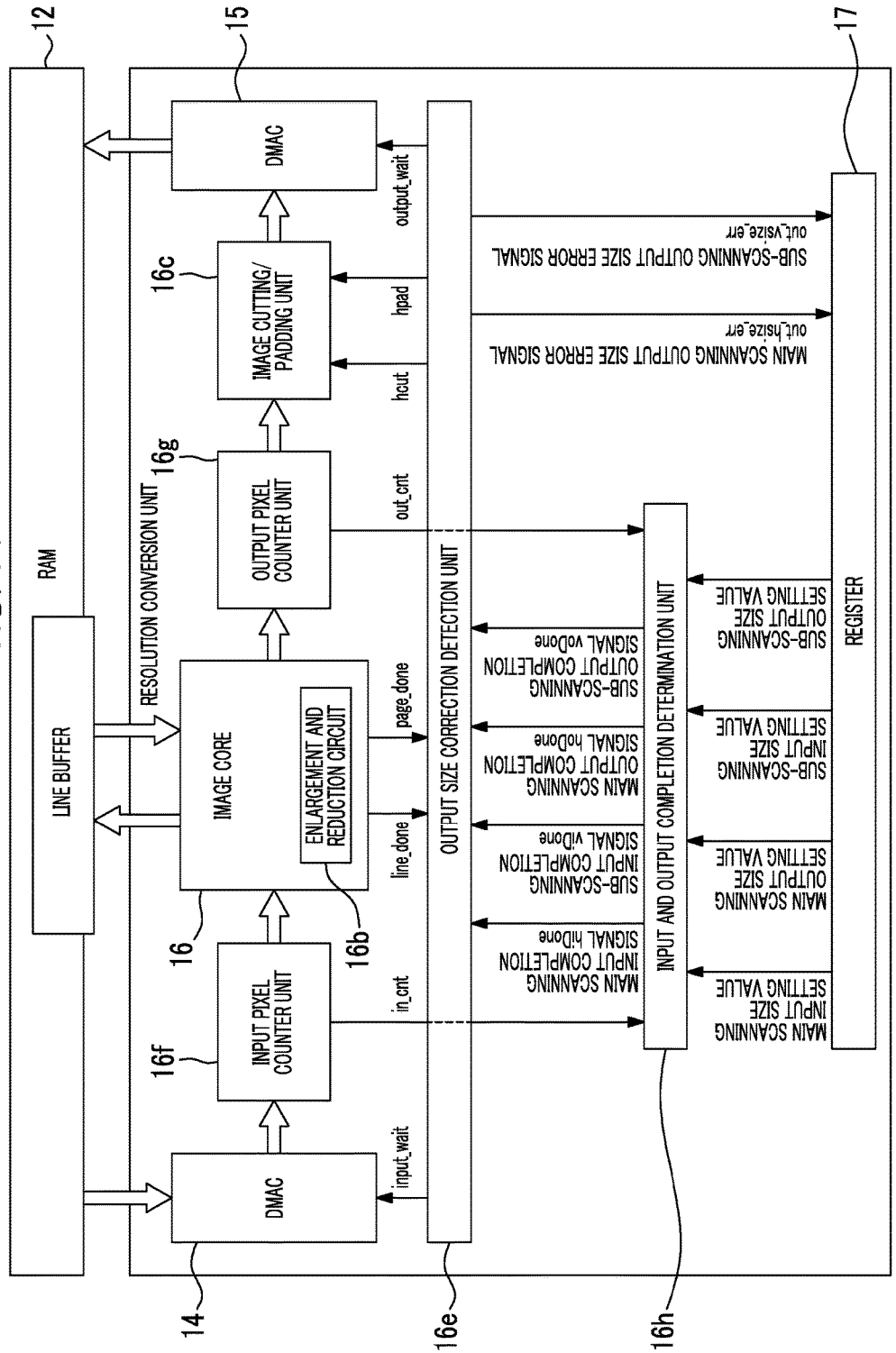
FIG. 14 is a diagram showing another exemplary embodiment of the configuration of the image processing apparatus according to the present exemplary embodiment.

FIG. 14 is a diagram showing another configuration example of the image processing apparatus 100 according to the present exemplary embodiment. In the configuration shown in FIG. 14, unlike the configuration shown in FIG. 4, the image cutting/padding unit 16c and the output size correction detection unit 16e are provided outside the image core 16. In addition, in the configuration shown in FIG. 14, an input pixel counter unit 16f, an output pixel counter unit 16g, and an input and output completion determination unit 16h are newly provided. On the other hand, in the configuration shown in FIG. 14, the input controller 16a and output controller 16d are not provided, and the function of the input controller 16a is realized by the DMAC 14 and the function of the output controller 16d is realized by the DMAC 15.

The enlargement and reduction circuit 16b and the image cutting/padding unit 16c perform the same processing as in the configuration shown in FIG. 4.

The output size correction detection unit 16e is different from the configuration shown in FIG. 4 in that the output size correction detection unit 16e outputs the input wait signal (input_wait) to the DMAC 14 and outputs the output wait signal (output_wait) to the DMAC 15.

The input pixel counter unit 16f has a main scanning input count and a sub-main scanning input count, and outputs count information (in_cnt) to the input and output completion determination unit 16h.

The output pixel counter unit 16g has a main scanning output count and a sub-main scanning output count, and outputs count information (out_cnt) to the input and output completion determination unit 16h.

The input and output completion determination unit 16h acquires a main scanning input size setting value, a sub-main scanning input size setting value, a main scanning output size setting value, and a sub-scanning output size setting value from the register 17. The input and output completion determination unit 16h acquires count information from each of the input pixel counter unit 16f and the output pixel counter unit 16g. Then, the input and output completion determination unit 16h generates the main scanning input completion signal (hiDone), the sub-scanning input completion signal (viDone), the main scanning output completion signal (hoDone), and the sub-scanning output completion signal (voDone) from the acquired information. The generated signals are used for the processing of the output size correction detection unit 16e.

More specifically, for example, in a case where the main scanning input size setting value and the main scanning input count are the same, the input and output completion determination unit 16*h* generates a main scanning input completion signal (hiDone=1). In addition, for example, in a case where the sub-main scanning input size setting value and the sub-main scanning input count are the same, the input and output completion determination unit 16*h* generates a sub-scanning input completion signal (viDone=1). In addition, for example, in a case where the main scanning output size setting value and the main scanning output count are the same, the input and output completion determination unit 16*h* generates a main scanning output completion signal (hoDone=1). In addition, for example, in a case where the sub-scanning output size setting value and the sub-main scanning output count are the same, the input and output completion determination unit 16*h* generates a sub-scanning output completion signal (voDone=1). The signal generated as described above is output to the output size correction detection unit 16*e*, and is used for generation of the cut enable signal (hcut) or the padding enable signal (hpad) and the like.

The program for realizing the exemplary embodiment of the invention may be provided not only by the communication unit but also by being stored in a recording medium, such as a CD-ROM.

While various exemplary embodiments and modification exemplary embodiments have been described above, it goes without saying that these exemplary embodiments and modification may be combined.

The present disclosure is not limited to the above-described exemplary embodiments, and can be implemented in various forms without departing from the scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic apparatus, comprising:
   an enlargement and reduction unit that enlarges or reduces an image input by direct memory access transfer;
   an image processing unit that, in a case where a size of an image after processing for enlargement or reduction by the enlargement and reduction unit is different from a size predetermined as a size of an image after the processing, performs processing for adding pixels to the processed image or processing for deleting pixels of the processed image; and
   a detection unit that detects a difference between the size of the processed image and the predetermined size based on an input completion signal indicating that an input of an image to the enlargement and reduction unit by the direct memory access transfer has been completed and an output completion signal indicating that an output of an image having the predetermined size from the enlargement and reduction unit to a direct memory access transfer controller has been completed,
   wherein the input completion signal includes a signal indicating that an input of an image in a main scanning direction has been completed and a signal indicating that an input of an image in a sub-scanning direction has been completed, and
   the output completion signal includes a signal indicating that an output of an image in the main scanning direction has been completed and a signal indicating that an output of an image in the sub-scanning direction has been completed.

2. The electronic apparatus according to claim 1,
   wherein the image processing unit performs the processing for adding the pixels or the processing for deleting the pixels in a case where the size of the processed image is different from the predetermined size in a main scanning direction, and performs the processing for adding the pixels or the processing for deleting the pixels in a case where the size of the processed image is different from the predetermined size in a sub-scanning direction.

3. The electronic apparatus according to claim 2, further comprising:
   a memory that stores information indicating that the size of the processed image is different from the predetermined size.

4. The electronic apparatus according to claim 2,
   wherein the image processing unit adds pixels such that the size of the processed image becomes the same as the predetermined size in a case where the size of the processed image is smaller than the predetermined size in each of the main scanning direction and the sub-scanning direction, and deletes pixels such that the size of the processed image becomes the same as the predetermined size in a case where the size of the processed image is larger than the predetermined size in each of the main scanning direction and the sub-scanning direction.

5. The electronic apparatus according to claim 4, further comprising:
   a memory that stores information indicating that the size of the processed image is different from the predetermined size.

6. The electronic apparatus according to claim 1, further comprising:
   a memory that stores information indicating that the size of the processed image is different from the predetermined size.

7. An electronic apparatus, comprising:
   a reception unit that receives an instruction to enlarge or reduce an image input by direct memory access transfer at a designated magnification;
   an enlargement and reduction unit that performs processing for enlarging or reducing the image at the designated magnification;
   a generation unit that performs processing for adding pixels to the processed image or processing for deleting pixels of the processed image to generate an image having a size that does not cause stalling in the direct memory access transfer in a case where the designated magnification is a magnification at which stalling may occur in the direct memory access transfer; and
   a detection unit that detects a difference between the size of the processed image and a size predetermined as a size of an image after the processing based on an input completion signal indicating that an input of an image to the electronic apparatus by the direct memory access transfer has been completed and an output completion signal indicating that an output of an image having the predetermined size from the electronic apparatus to a direct memory access transfer controller has been completed, wherein the input completion signal includes a signal indicating that an input of an image in a main scanning direction has been completed and a signal indicating that an input of an image in a sub-scanning direction has been completed, and the output completion signal includes a signal indicating that an output of an image in the main scanning direction has been completed and a signal indicating that an output of an image in the sub-scanning direction has been completed.

8. A non-transitory computer readable medium storing a program causing a computer to realize the functions of:

enlarging or reducing an image input by direct memory access transfer; and in a case where a size of an image after processing for enlargement or reduction is different from a size predetermined as a size of an image after the processing, performing processing for adding pixels to the processed image or processing for deleting pixels of the processed image;

detecting a difference between the size of the processed image and the predetermined size based on an input completion signal indicating that an input of an image to the electronic apparatus by the direct memory access transfer has been completed and an output completion signal indicating that an output of an image having the predetermined size from the electronic apparatus to a direct memory access transfer controller has been completed, wherein the input completion signal includes a signal indicating that an input of an image in a main scanning direction has been completed and a signal indicating that an input of an image in a sub-scanning direction has been completed, and the output completion signal includes a signal indicating that an output of an image in the main scanning direction has been completed and a signal indicating that an output of an image in the sub-scanning direction has been completed.

* * * * *